(12) United States Patent
Intriligator et al.

(10) Patent No.: US 7,096,121 B2
(45) Date of Patent: *Aug. 22, 2006

(54) SPACE WEATHER PREDICTION SYSTEM AND METHOD

(75) Inventors: Devrie S Intriligator, Santa Monica, CA (US); James M Intriligator, Santa Monica, CA (US)

(73) Assignee: Carmel Systems LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/985,021

(22) Filed: Nov. 9, 2004

(65) Prior Publication Data

US 2005/0159894 A1 Jul. 21, 2005

Related U.S. Application Data

(63) Continuation of application No. 10/463,121, filed on Jun. 16, 2003, now Pat. No. 6,816,786, which is a continuation-in-part of application No. 09/837,690, filed on Apr. 18, 2001, now Pat. No. 6,581,008, which is a continuation-in-part of application No. 09/552,161, filed on Apr. 18, 2000, now Pat. No. 6,356,842.

(51) Int. Cl.
*G01N 1/00* (2006.01)

(52) U.S. Cl. ............................................... 702/3

(58) Field of Classification Search .................. 702/2, 702/3, 4
See application file for complete search history.

(56) References Cited

U.S. PATENT DOCUMENTS

| | | | |
|---|---|---|---|
| 4,390,869 A * | 6/1983 | Christen et al. ............ 340/632 |
| 5,373,456 A | 12/1994 | Ferkinhoff et al. | |
| 5,398,021 A | 3/1995 | Moore | |
| 5,408,586 A | 4/1995 | Skeirik | |
| 5,444,820 A | 8/1995 | Tzes et al. | |
| 5,461,699 A | 10/1995 | Arbabi et al. | |
| 5,469,369 A * | 11/1995 | Rose-Pehrsson et al. ..... 702/27 |
| 5,499,196 A * | 3/1996 | Pacheco ..................... 702/81 |
| 5,555,446 A | 9/1996 | Jasiinski | |
| 5,652,717 A * | 7/1997 | Miller et al. .................. 703/6 |

(Continued)

OTHER PUBLICATIONS

"National Space Weather Program Strategic Plan," Version 4.0, (Draft), prepared by the Working Group for the National Space Weather Program of the Committee for Space Environment Forecasting of the Office of the Federal Coordinator for Meteorology, Mar. 1995.

(Continued)

*Primary Examiner*—Donald McElheny, Jr.
(74) *Attorney, Agent, or Firm*—Jones Day

(57) ABSTRACT

A system and method of forecasting space weather (at Earth or another location) based on identifying complex patterns in solar, interplanetary, or geophysical data. These data may include current or historical measurements and/or modeled data (predicted or simulated). Data patterns (both non-event and event-related) are identified (even when another event is occurring). Such patterns may vary with recent/cyclic variations in solar (e.g. solar max/min), interplanetary, or geophysical activity. Embodiments are built around: (1) templates, (2) expert systems, (3) neural networks, (4) hybrid systems comprising combinations of (1), (2) and/or (3), and multimodal intelligent systems. Forecasts are customized and/or updated as new data arise and as systems are dynamically modified (e.g. via feedback between system parts). Numerical or other indexes are generated representing: forecasts, associated confidence levels, etc. The invention predicts events/non-events and/or other values or parameters associated with space weather (e.g. Dst, event onset time, duration, etc.)

54 Claims, 19 Drawing Sheets

U.S. PATENT DOCUMENTS

| | | | |
|---|---|---|---|
| 5,673,366 A * | 9/1997 | Maynard et al. | 706/14 |
| 5,682,503 A | 10/1997 | Yoda | |
| 5,724,255 A * | 3/1998 | Smith et al. | 700/266 |
| 5,808,916 A * | 9/1998 | Orr et al. | 703/6 |
| 5,943,629 A * | 8/1999 | Ballard et al. | 702/2 |
| 6,023,223 A * | 2/2000 | Baxter, Jr. | 340/531 |
| 6,104,582 A | 8/2000 | Cannon et al. | |
| 6,199,008 B1 | 3/2001 | Aratow et al. | |
| 6,356,842 B1 * | 3/2002 | Intriligator et al. | 702/3 |
| 6,581,008 B1 * | 6/2003 | Intriligator et al. | 702/3 |
| 6,816,786 B1 * | 11/2004 | Intriligator et al. | 702/3 |
| 2001/0027389 A1 * | 10/2001 | Beverina et al. | 703/22 |
| 2002/0120642 A1 * | 8/2002 | Fetherston | 707/500 |
| 2003/0065409 A1 * | 4/2003 | Raeth et al. | 700/31 |
| 2004/0012491 A1 * | 1/2004 | Kulesz et al. | 340/506 |
| 2004/0015336 A1 * | 1/2004 | Kulesz et al. | 703/11 |

OTHER PUBLICATIONS

"Storms in Space," CRCSS Space Industry News, Issue 81, Dec. 1998, 7 pages.

Bounsanto et al., "Strides Made in Understanding Space Weather at Earth," Eos. vol. 78, No. 1, Jan. 7, 1997, pp. 1, 6-7, copyright 1997 [retrieved on Feb. 4, 1998]; retrieved from the Internet:<URL:www.agu.org/sci_soc/eosbuon.html>.

Cane et al., "The Role of Interplanetary Shocks in the Longitude Distribution of Solar Energetic Particles," Journal of Geophysical Research, vol. 93, No. A9, pp. 9555-9567, Sep. 1, 1988.

Cane, "The Evolution of Interplanetary Shocks," Journal of Geophysical Research, vol. 90, No. A1, pp. 191-197, Jan. 1, 1985.

Carmel Research Center, "Carmel Research Center Space Weather System for Forecasting Environmental Disturbances," Project Summary, submitted May 24, 1996.

Carmel Research Center, "Carmel Research Center Space Weather System for Forecasting Environmental Disturbances," Project Summary, submitted Jan. 23, 1997.

Carmel Research Center, "Solar Energetic Particles (SEPs) as Forecasters of Environmental Disturbances," Project Summary, submitted Jul. 7, 1995.

Chen et al., "Real-time identification and prediction of geoeffective solar wind structures," Geophysical Research Letters, vol. 23, No. 6, pp. 625-628, Mar. 15, 1996.

Detman et al., "Real-time Kp Predictions from ACE Real Time Solar Wind," CP471, Solar Wind Nine, edited by Habbal et al., 1999, The American Institute of Physics.

Dooling, "Stormy Weather In Space," IEEE Spectrum, pp. 64, 66-72, Jun. 1995.

Dryer, "Multidimensional, Magnetohydrodynamic Simulation of Solar-Generated Disturbances: Space Weather Forecasting of Geomagnetic Storms," AIAA Journal, vol. 36, No. 3, pp. 365-370, Mar. 1998.

Fan et al., "Prediction of Geomagnetic Storms Following Solar Proton Events (SPEs) with a BP Neural Network," *AI Applications in Solar-Terrestial Physics*, Proceedings of ESA Workshop (WPP-148), pp. 163-166, 1998.

Freeman et al., "The Use Of Neural Networks to Predict Magnetospheric Parameters for Input to a Magnetospheric Forecast Model," pp. 167-181.

Intriligator et al., "A kick from the solar wind as the cause of comet Halley's Feb. 1991 flare," Nature, vol. 353, pp. 407-409, Oct. 3, 1991.

Intriligator et al., "Mars in the Solar Wind," vol. 84, No. B14, pp. 8427-8435, Dec. 30, 1979.

Intriligator et al., "Plasma Shocks and Energetic Particles in the Outer Solar System: Trapping and Asymmetry Observations From Pioneer 10 and Pioneer 11," Journal of Geophysical Research, vol. 87, No. A6, pp. 4354-4364, Jun. 1, 1982.

Intriligator, "New Results on the Pioneer Venus Orbiter Feb. 10-11, 1982 Events: A Solar Wind Disturbance Not a Comet," Geophysical Research Letters, vol. 12, No. 4, pp. 187-190, Apr. 1985.

Intriligator, "Pioneer 9 and Pioneer 10 Observations of the Solar Wind Associated with the Aug. 1972 Events," Journal of Geophysical Research, vol. 82, No. 4, pp. 603-617, Feb. 1, 1977.

Intriligator, "Transient Phenomena Originating At The Sun—An Interplanetary View," Solar and Interplanetary Dynamics, copyright 1980, pp. 357-374.

Joselyn, "Geomagnetic Activity Forecasting: The State of the Art," Review of Geophysics, 33, 3, pp. 383-401, Aug. 1995.

Persinger, "When the Chips are Down," from Science Frontiers #80, Mar.-Apr. 1992 [retrieved on Feb. 4, 1998]; retrieved from the Internet: <www.knowledge.co.uk/frontiers/sf080/sf080u20.htm>.

Smart et al., "A Simplified Model for Timing the Arrival of Solar Flare-Initiated Shocks," Journal of Geophysical Research, vol. 90, No. A1, pp. 183-190, Jan. 1, 1985.

Smart et al., "PPS76—A Computerized 'Event Mode' Solar Proton Forecasting Technique," pp. 406-427.

Smith et al., "Forecasting Geomagnetic Storms using Energetic Particle Enhancements," CP471, *Solar Wind Nine*, edited by Habbal et al., 1999, pp. 577-580.

Wang et al., "Solar Wind Speed and Coronal Flux-Tube Expansion," The Astrophysical Journal, vol. 355, pp. 726-732, Jun. 1, 1990.

Wu et al., "Prediction of geomagnetic storms from solar wind data using Elman recurrent neural networks," Geophysical Research Letters, vol. 23, No. 4, pp. 319-322, Feb. 15, 1996.

Australian Patent Application No. 2001257106 Examiner's First Report dated Jan. 12, 2005.

Bell et al., "Imager for Magnetopause-to-Aurora Global Exploration Image," Science Center (online), May 20, 2000 [retrieved on Mar. 4, 2004]; retrieved from the internet: <URL:http://web.archive.org/web/20000520080209/image.gsfc.nasa.gov/>.

International Search Report of PCT International Application No. PCT/US01/12708, mailed Jun. 19, 2001.

International Search Report of PCT International Application No. PCT/US04/19175, mailed Nov. 3, 2004.

Phillips, "The Radar Cop in Space," Space Center News (online), May 11, 2000 [retrieved on Mar. 4, 2004]; retrieved from the internet: <URL:http://web.archive.org/web/20000817230056/www.spacesceiences.com/headlines/y2000/ast24mar_1m.htm>.

* cited by examiner

Subroutine CalculateSimilarity(Sample, Template) at Slide of Zero

SPACE WEATHER PREDICTION SYSTEM AND METHOD

CROSS-REFERENCE TO RELATED APPLICATION

This application is a continuation of U.S. patent application Ser. No. 10/463,121, file Jun. 16, 2003 due to issue as U.S. Pat. No. 6,816,786 on Nov. 9, 2004, which is a continuation-in-part of U.S. patent application Ser. No. 09/837,690, file Apr. 18, 2001 issued as U.S. Pat. No. 6,581,008 on Jun. 17, 2003, which is a continuation-in-part of U.S. patent application Ser. No. 09/552,161, file Apr. 18, 2000 issued as U.S. Pat. No. 6,356,842 on Mar. 12, 2002. The entire contents of these three applications is expressly incorporated herein by reference.

FIELD OF THE INVENTION

The present invention relates to a system and method for predicting space weather, and in particular, for predicting solar-induced disturbances of the environment of near-earth space, such as geomagnetic storms. More specifically, the invention relates to predicting space weather based on the analysis of complex patterns in solar, interplanetary, and geophysical data.

BACKGROUND OF THE INVENTION

When solar flares, disappearing filaments, and other solar events occur on the sun they create great turbulences and disturbances in the region of space close to the sun. These disturbances are often so extreme that they create shock waves which travel through space and, ultimately, arrive at the earth or at other locations of interest (e.g. a spacecraft position, a comet, or a planet), where they can cause serious problems such as loss of spacecraft, spacecraft anomalies (such as bit flips in electronic components), surface charging problems, disruption of on-board computer memories, and even damage to the structure of semi-conductor microelectronics and solar cells. The charged particles, including energetic electrons and protons, associated with these disturbances can do as much damage to solar cells and other hardware in one disturbance as several years' exposure to the undisturbed environment. For example, energetic electrons can cause large static charges, some measuring as high as 19,000 volts, to build up in insulators deep in spacecraft, which may cause arcing that damage sensitive electronic components. In addition, astronauts both inside and outside a spacecraft, space station or shuttle can be subjected to dangerous doses of protons and other types of radiation during these disturbances.

These disturbances can also cause communications blackouts at all frequencies, not only with spacecraft, but with high-flying aircraft and with ground-based objects. High frequency (HF) radio wave communication is more routinely affected since it depends on reflection from the ionosphere to carry signals great distances. Ionospheric irregularities caused by solar disturbances give rise to signal dispersion, fading, and even complete signal loss during very disturbed conditions. Ionospheric irregularities also affect the higher frequency radio waves used by telecommunication companies that penetrate the ionosphere and are relayed via satellite to other locations. The ionospheric irregularities can even prohibit critical communications such as search and rescue efforts and military operations.

One example of a serious space weather related communications failure took place in the early 1980s when President Reagan was on Air Force One on his way to China—all communications were lost with the plane for more than two hours. Mr. Reagan and his advisors were upset and concerned; they were subsequently informed that the failure was due to disturbances that originated on the sun and eventually propagated to the near earth environment.

In addition to communications systems, marine navigation systems using very low frequency signals, such as LORAN and OMEGA, depend on accurate information on the altitude of the bottom of the ionosphere. During environmental disturbances, rapid vertical changes occur in the location of this boundary, introducing significant errors of up to several kilometers in determinations of location.

Global Positioning Systems (GPS) are also sensitive to space weather disturbances. These systems have a wide variety of applications including aircraft navigation and air traffic control systems. However, because they operate by transmitting radio waves from satellites to receivers on the ground, in aircraft, or in other satellites, they are very sensitive to ionospheric disturbances. Significant errors can result when signals are reflected, refracted and slowed by disturbed ionospheric conditions.

Electric power companies are also affected by space weather disturbances because their long power lines are susceptible to electric currents induced by the dramatic changes in high-altitude ionospheric currents occurring during geomagnetic storms. Surges in power lines from ground induced currents (GICs) can cause massive network failures and permanent damage to expensive equipment. It is estimated that the March 1989 Hydro-Quebec power black-out, which was caused by a space weather disturbance, cut electric power to several million people.

With accurate early warning, spacecraft operators can take effective remedial action, such as phased shut downs of components where the most sensitive elements are turned off first and the other components are shut down closer to the predicted onset of the event. Other remedial actions include downloading spacecraft memory to ground-based memory; shutting down all spacecraft systems except those necessary for real-time tracking; increasing real-time monitoring of satellite operations for anomalies; delaying major changes in vehicle potential caused by turning on/off susceptible components; and calculating the best time to adjust a low earth orbit for drag. For military communications, redundant transmissions could be scheduled along with real-time human monitoring as a check of communication integrity. For space stations and shuttles, extra-vehicular activity could be curtailed, launches could be delayed or early landings planned to avoid a disturbance.

Such remedial actions are currently impractical due to the generally short lead time (approximately one hour) and overwhelming inaccuracy (over 80 percent false alarms) of space weather disturbance predictions. If operators were given an accurate warning at least several hours in advance of a space weather event, they would have a great deal more flexibility in developing and implementing strategies for protecting their spacecraft, systems, and/or astronauts. In addition, power companies could, for example, reduce the load on transmission circuits, confidently reset tripped protective relays on power networks, selectively ground capacitor banks to prevent large potential drops and delay power station maintenance and equipment replacement. Telecommunication companies could, for example, look for alternate frequencies for transmissions and effect plans to minimize communications outages.

The space weather forecasts provided by the National Oceanic and Atmospheric Administration's (NOAA's) Space Environment Center (SEC), the civilian office responsible for space weather forecasts, demonstrate the need for improvement that this invention addresses. Until several years ago, these forecasts were made entirely "by eye." Operators would examine the raw data (primarily solar magnetic field, x-ray, and optical data) and then, based on intuition and experience, issue forecasts. According to the SEC's own statistics, only 30% of the storms that they forecast actually occurred. There are also many false negatives (i.e., times when they do not forecast storms that do occur) and the generally brief forecast horizon often does not provide sufficient time for effective remedial action.

Recently, others have attempted to generate more 'objective' forecasts based at least in part on solar wind and interplanetary magnetic field (IMF) data obtained from the Advance Composition Explorer (ACE) and the WIND spacecraft. Both these spacecraft are very close to the Earth (compared to the distance between the Earth and the sun) and therefore forecasts based on their measurements of solar wind and IMF have a very short lead time. Typically, these systems produce forecasts that have a lead time of one hour or less and often they are ex post facto (i.e. they generate a "prediction" after the event has already begun to disturb the geophysical environment).

Still other forecasting approaches rely upon data from solar event observations, inputting these data into various theoretical models that attempt to predict how the solar events, and their associated shock waves, will propagate through space and effect space weather. The Wang-Sheeley model, the Interplanetary Shock Propagation Model (ISPM) (see Dryer, M. 1998, "Multidimensional simulation of solar-generated disturbances: Space weather forecasting of geomagnetic storms," AIAA Journal, 36, 365–370), and the Shock Time Of Arrival (STOA) model (see Smart, D. F. and Shea, M. A. 1985, "A simplified model for timing the arrival of solar flare-initiated shocks," Journal of Geophysical Research, 90, 183–190) are examples of various theoretical models. These approaches have met with limited success due in part to the difficulty of accurately modeling the propagation of solar events through space and often in part to the lack of complete data on the solar events themselves.

It has been recognized that there is an association between SEP events and subsequent geomagnetic storms. SEPs are created when a large disturbance occurs on the sun and as the disturbance propagates through space. Some of these particles travel towards distant locations (e.g. the Earth, spacecraft, etc.) much more rapidly than the interplanetary shocks that cause many space weather events. They thus may potentially extend the space weather forecast horizon to several hours in advance of a storm and, at times, even a day or more in advance.

Past attempts to use SEPs for space weather prediction have been limited. For example, J. Joselyn described a simplistic technique for forecasting geomagnetic activity. She compared a single measure of SEP activity in only one energy channel to a set threshold. In particular, she looked at SEP events in which a flux of more than 10 protons per centimeter 2/second of energies exceeding 10 MeV (million electron-volts) occurred for at least 30 minutes; i.e., See Joselyn, J. 1995. Geomagnetic Activity Forecasting: The State of the Art. Reviews of Geophysics, 33, 3. Based on that criterion, she determined that between 1976 and 1989 such events preceded geomagnetic storms (Ap>30, where Ap is the well known global geomagnetic index) within 2–3 days 62% of the time. Joselyn also found that events with peak energetic particle fluxes exceeding 100 flux units preceded geomagnetic storms 75% of the time. Joselyn did not discuss the number or percentage of geomagnetic storms that a forecast based on such events would miss. Joselyn only compared SEP flux to a simple threshold, i.e., a single SEP data value. This simple single point comparison is too simplistic for useful prediction.

More recently, Q. Fan and J. Tian have used measures derived from two SEP values (e.g., the rise rate of SEP flux over time) as inputs to a neural network to attempt to classify the intensity of geomagnetic storms based in part on SEP data. See Fan, Q. and Tian, J. 1998, Prediction of geomagnetic storms following solar proton events (SPEs) with a back-propagation neural network, "Prediction of Geomagnetic Storms Following Solar Proton Events (SPEs) With a BP Neural Network," AI Applications in Solar-Terrestrial Physics. Proceedings of ESA Workshop (WPP-148), edited by I. Sandahl and E. Jonsson, pp. 163–166. Each SEP (proton and electron) flux rise rate was based on only two SEP flux values, the background flux value and the peak flux value. Although Fan and Tian thus begin to recognize the value of time variations in SEP data, they, and Joselyn, failed to capture the potential of solar energetic particles as a space weather prediction tool.

Previous attempts at using SEPs in space weather forecasting have met with only limited success for many reasons. First, the prior work based predictions on only one SEP data point (a threshold or peak value) and/or measures derived from two SEP data points (such as rise rate). They therefore are not capable of identifying complex patterns in SEP data, associated with space weather events, that require consideration of three or more data points. Second, the prior work was based on analysis of only SEP data preceding space weather events, but not of SEP data preceding non-events; any system that does not take into account non-events is susceptible to false alarms and is unable to give all clear signals. Third, the prior work does not recognize the fundamental importance of recent and/or cyclical variations in SEP data (and solar, interplanetary and geophysical activity), such as variations that occur across different phases of the solar cycle. Fourth, the prior work does not provide any indication of a confidence level, such as a numerical confidence index, in a forecast. Fifth, the prior work was unable to provide a forecast while another event was in progress. Sixth, the prior work was unable to meaningfully update forecasts as new data came in.

Additionally, nearly all work prior to this invention has focused on creating prediction or identification systems based around one (or at most, several) rules or equations. Because of the highly complex nature of space weather phenomena, such simple systems are incapable of accurately modeling many of the most important aspects of space weather. Furthermore, many variables related to space weather interact to modify (or otherwise constrain) each other. Simple systems fail to take advantage of this potentially useful inter-connectedness. Because of these and other reasons, such systems have proven quite poor at generating space weather related forecasts. There is therefore a need for a space weather forecasting system that can synergistically combine separate forecasting systems and techniques.

Also, there is a need for improved notification systems for space weather events. Even the current "best" space weather forecast systems, yield only broad predictions in terms of space (e.g. North America, Alaska, or Sweden) or time (e.g. a spacecraft anomaly sometime in the next three days). Such broad predictions are of little use to most end-users. Currently, the only more specific forecasts are those that are based on ACE data (and thus have a lead-time of, at best, 45 minutes). The prior work has thus been unable to issue forecasts and/or initiate action sequences that were customized to meet the needs of end users.

SUMMARY OF THE INVENTION

It is therefore an object of the present invention to provide improved and timely space weather forecasts based on real time SEP data and solar, interplanetary and geophysical data.

It is a further object of the present invention to provide space weather forecasts based on the identification of complex patterns in SEP data requiring consideration of three or more different SEP data values.

It is another object of the present invention to provide a space weather forecasting system that identifies SEP data, and solar, interplanetary and geophysical data, associated with space weather non-events.

It is yet another object of the present invention to provide space weather forecasts that take into consideration recent and/or cyclical variations, such as variations due to the phase of the solar cycle, in SEP data and solar, interplanetary and geophysical data.

It is yet another object of the present invention to provide space weather forecasts that can be meaningfully updated as new data are made available and as the system is dynamically modified (e.g., via data feedback, etc.).

It is yet another object of the present invention to provide a system capable of generating space weather forecasts during periods when another space weather event is already in progress.

It is yet another object of the present invention to provide a space weather forecasting system capable of generating a numerical index representing a confidence level associated with a space weather forecast.

It is yet another object of the present invention to provide a space weather forecasting system capable of working as a "hybrid system," whereby different parts of the system are specialized for different types of prediction and thus the overall system accuracy is improved.

It is yet another object of the present invention to provide a space weather forecasting system capable of being modified as a result of current forecasting accuracy/inaccuracy to increase future forecasting accuracy.

It is a further object of the present invention to create systems capable of yielding numeric or other indexes representing or associated with an identification or prediction.

It is yet another object of the present invention to provide a space weather forecasting system capable of working as a "cascading hybrid system," whereby multiple prediction/ identification systems work synergistically and iteratively to generate predictions, identifications, or forecasts.

It is yet a further object of the present invention to provide a space weather forecasting system capable of including subsystems based on numerous and varied prediction/identification systems and techniques—and to enable these systems and techniques to synergeristically interact with each other to yield better space weather related predictions/ identifications.

It is yet a further object of the present invention to provide a space weather forecasting system capable of interfacing and/or interacting with other space weather prediction/identification systems.

It is yet another object of the present invention to provide a space weather forecasting system that is capable of identifying events, conditions, etc. as natural or man-made.

It is yet another object of the present invention to provide a system capable of yielding results (predictions, identifications, etc.) that can be used to derive, constrain or improve physical, biological, chemical, or other models, equations, techniques, etc.

It is yet another object of the present invention to provide a space weather forecasting system capable of generating customized ("tailor-made") forecasts, predictions, or identifications. Such results could, within the scope of this invention, be customized based on numerous end-user constraints, demands, susceptibilities, positions, etc.

It is still another object of the present invention to provide a space weather forecasting system capable of transmitting, displaying, or otherwise communicating (e.g. audibly) the results of tailor-made forecasts in numerous (and numerously specifiable) ways.

It is still another object of the present invention to provide a space weather forecasting system capable of initiating (or causing to be initiated) numerous (and numerously specifiable) mitigating actions to be undertaken based on the space weather forecasts, identifications, or predictions generated or issued by the space weather forecasting system.

It is yet another object of the present invention to provide a space weather forecasting system that can be "modularized" with different parts, subroutines, databases, displays, etc. possibly residing on multiple (possibly remote) computers, systems, etc.

The above and other objects are realized by the system and method of the present invention. Briefly, the present invention provides a system and method of forecasting space weather events based on identifying complex patterns defined by three or more SEP data values and associated patterns in solar, interplanetary, or geophysical data. The present invention further identifies data patterns associated with space weather non-events, as well as those patterns associated with events. In addition, the patterns identified may change depending on recent or cyclic variations in solar, interplanetary, or geophysical activity, such as variations associated with the phase of the solar cycle.

Three embodiments of the present invention are described below: (1) a template-based embodiment, (2) an expert system-based embodiment, and (3) a neural network based embodiment. The template-based embodiment predicts space weather based on a comparison of current SEP data (and other solar, interplanetary, or geophysical data of interest) with historically derived "templates," each containing three or more SEP data measurements (and other data of interest) associated with the presence or absence of a particular type of space weather event. Separate templates are provided, where appropriate, for different recent and/or cyclic variations in solar, interplanetary, or geophysical activity, such as, but not limited to, variations associated with the phase of the solar cycle. The expert system-based embodiment predicts space weather based on a set of rules that identify patterns in SEP data comprising three or more data points. Such patterns include, for example, (i) a peak in SEP data and (ii) a steep rise or peak in x-rays followed by a steep rise or peak in SEPs. Again, separate rules are provided, where appropriate, for recent and/or cyclic variations in solar, interplanetary, or geophysical activity. The neural network embodiment predicts space weather based on the input of three or more current SEP data values, possibly together with solar, interplanetary, or geophysical activity data values, and, where appropriate, information regarding recent and/or cyclic variations in solar, interplanetary, or geophysical activity. It is trained with data from quiet weather states as well as stormy states and, where appropriate, it can be trained with information regarding recent and/or cyclic variations in solar, interplanetary, or geophysical activity. Alternatively, where appropriate, separate neural networks may be used for different phases associated with recent and/or cyclic variations in activity.

More particularly, in the template-based embodiment, the system forecasts space weather events based on comparisons of real-time data with historically derived "templates." These templates contain representations of activity associated with a particular type of space weather event or with a non-event. For example, three templates might be used, each representing the SEP activity before storms of different severities. Each of these templates may consist of ten hourly measurements of the number of SEPs having energy>1 MeV for a particular phase of the solar cycle. This embodiment then finds the best match between the last ten hours of real time SEP data and the set of templates associated with the current phase of the solar cycle. The template that most closely matches the new data is used to determine the current forecast. As more data are obtained (for example, over the next few hours), new comparisons are made and the forecast updated. Additionally, a template may include other data of interest, as identified below, such as x-ray data. The system then finds, in this example, the template that most closely matches the recent SEP and x-ray data.

In the expert system embodiment, space weather forecasts are based on a set of rules that identify patterns in SEP data comprising three or more data points and associated patterns in solar, interplanetary, or geophysical data. For example, a rule may involve the detection of a "peak" (i.e. a pattern of "low-high-low") in SEP data, having particular characteristics based on the current phase of the solar cycle (i.e., the particular characteristics of the peak are derived from earlier data associated with a phase of the solar cycle that is the same as the current phase). Alternatively, a rule may involve a relationship between SEP and other data, such as the detection of a peak in x-ray data followed by a steep rise or peak in SEP data. Still further, a rule may involve modifying SEP and other data, by for example "blurring" it, to filter out anomalous or insignificant measurements.

In the neural network embodiment, one or more neural networks are trained with three or more SEP data items associated with space weather events, possibly together with associated solar, interplanetary, or geophysical data, and, where appropriate, solar cycle phase data, or other data identifying a phase of a recent or cyclic variation in data. The neural networks are also trained with non-event data for more accurately predicting times when no space weather event will occur and for signaling all clear. The neural networks are then used to generate forecasts based on recent SEP data and, where appropriate, solar cycle phase. Alternatively, the neural network may additionally be trained with other solar, interplanetary, and geophysical data of interest, such as, but not limited to, x-ray data.

In general, these embodiments of the invention are not limited to space weather forecasts based upon SEPs or solar data in a particular energy band or having a particular flux level. Nor are they limited to a particular species of particle (protons, electrons, alphas, oxygen ions, iron ions) or waves (x-ray, radio waves, microwaves, etc). Nor are they limited to the use of actual SEP or solar or interplanetary or geophysical data—modeled or simulated data can be used, or in many instances, precursor signals such as microwave bursts, disappearing filaments, sunspot activity, helioseismology parameters, etc. can be used as proxies for actual data.

Furthermore, the template embodiment is not limited to a specific technique for creating the templates, nor to a particular number of templates, nor to the use of a particular technique for comparing new data to the templates. Also, the expert system is not limited to any particular static (or even dynamic) set of rules that determines how the identification and/or classification of data satisfying a particular set of criteria is accomplished. Finally, the neural network embodiment is not limited to a specific technique for training the neural networks nor to a particular neural network architecture.

For each of the embodiments, one or more inputs could be from the results of another template system, expert system or neural network, or from a hybrid combination of these, or, more generally, from any hybrid multimodal intelligent system.

In accordance with another aspect of the present invention, the accuracy of forecasts can be enhanced and forecasts can be readily customized by arranging a collection of prediction/identification modules, or methods, (referred to herein as PIMs), in a "cascading hybrid" system in which the outputs of the PIMs are used as inputs into the same or other PIMs. Each PIM, or subsystem, is based around an embodiment of a rule, system, or technique that is either related (directly or indirectly) to space weather prediction or related (directly or indirectly) to systems, services or objects (including humans, chemicals, animals, etc) that may either influence or be influenced by space weather related variables, events, or phenomena. A PIM may be the above-mentioned template, expert, neural network or hybrid systems or any other technique for predicting space weather or generating or predicting values or parameters that are useful (either directly or indirectly) in space weather prediction.

The results (predictions, identifications, etc) of a cascading hybrid system can be customized based on the requirements of an end-user. Such customization includes, but is not limited to, customized reports, customized warnings, customized alerts and customized actions (e.g. system modifications, mitigating actions, etc.) to be performed in particular situations.

DESCRIPTION OF THE PREFERRED EMBODIMENTS

Figure 1:
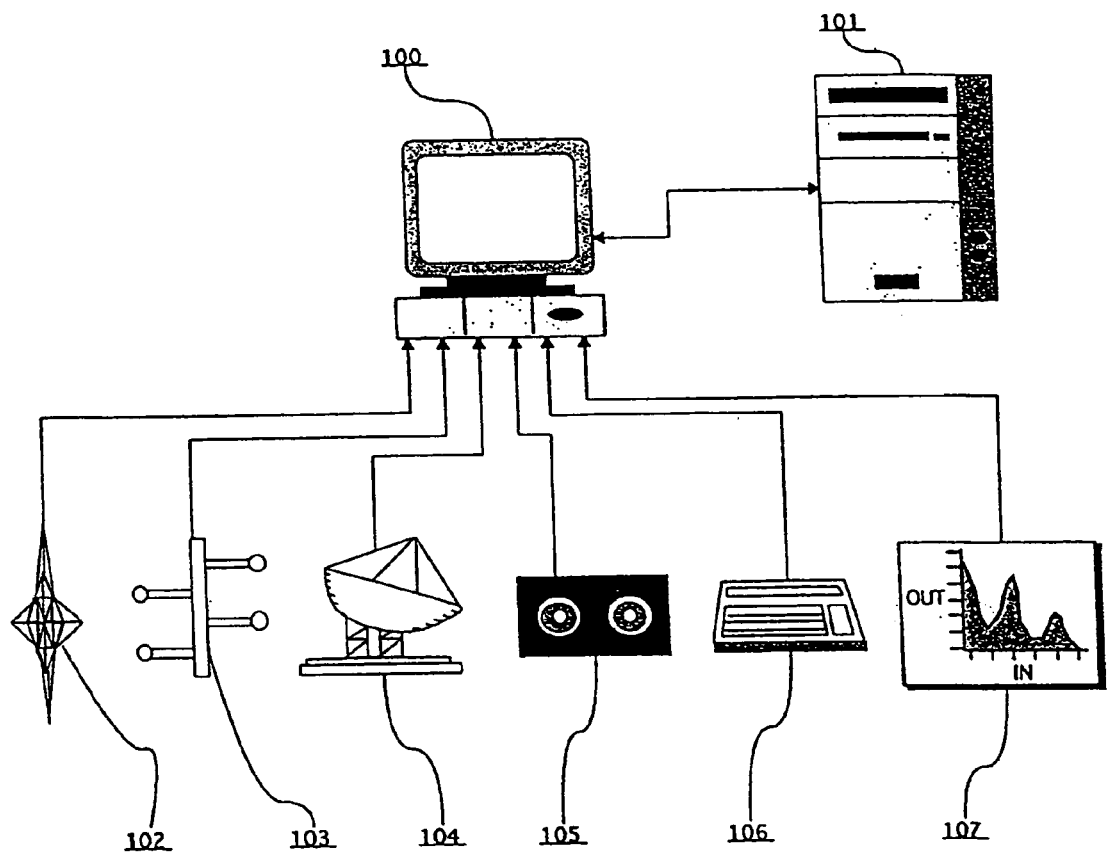
FIG. 1 illustrates the basic hardware setup of a preferred embodiment of the present invention.

Solar energetic particles include protons, electrons, alphas and various species, such as 3He, 4He, Fe, O, etc. SEP data include (i) species ratios, such as protons/alphas, 3He/4He, Fe/O, etc., (ii) various integral and differential energy ranges (e.g., >1 Mev, between 3 and 5 Mev, etc.), (iii) fluxes, log fluxes, flux ratios, and other derived parameters and variations of flux in, between, and across various energy ranges (e.g. the energetic particle counts over a recent time interval) (iv) spectral shapes, spectral ratios, and other derived spectral parameters and variations, (v) time between occurrences of SEP events, their duration or rate of change (e.g., gradual, impulsive), the number of hours since the last SEP event, etc. Other data of interest include (i) solar data, such as, but not limited to, x-ray, optical, gamma-ray, radio wave, microwave, disappearing filament, EUV, UV, heliomagnetic, helioseismologic data, (ii) geophysical data, such as, but not limited to, Kp, Ap, geomagnetic storm and Dst data, (iii) interplanetary data, such as, but not limited to, waves, derived parameters (e.g., shock speed, direction, strength, etc.) and (iv) other variations and derived parameters of the data, such as time between occurrence of events, the duration of events, the number of hours since the last event, the number of hours since the event before the last event, etc.

The term "space weather disturbance" is used to refer to many events including, but not limited to, any (or any combination) of the following occurrences:

(a) The occurrence of a "sudden commencement," i.e., an abrupt increase in the strength of the horizontal component of the earth's magnetic field.

(b) A sudden change (rise or fall) in the level of Kp, where Kp is the planet-wide (global) average K index. The K index is a quasi-logarithmic number between 0 and 9 derived from measurements during specified 3-hour periods of the maximum deviation (in nanoteslas) of the observed geomagnetic field from expected quiet field conditions. The K index is adjusted for expected geophysical biases between observing sites.

(c) A sudden change (rise or fall) in the level of A, AA, Ap or other geophysical indices.

(d) The occurrence of local ground-induced currents (GICs).

(e) The occurrence of regions of high radiation in the upper atmosphere or Earth's magnetosphere.

(f) The formation or dissolution of radiation belts in the Earth's magnetosphere.

(g) A sudden change (rise or fall) in the level of Dst, where Dst is the planet-wide (global) index of the ring current and is based on ground measurement of the variation in the horizontal (H) component of the Earth's magnetic field.

(h) The occurrence of a solar or interplanetary shock at Earth or in the near-Earth environment and its arrival time, strength, speed, post-shock solar wind velocity and geoeffective interplanetary magnetic field component, minimum time between shock arrival and coronal mass ejection arrival, etc.

(i) A compression or expansion of the Earth's magnetosphere.

(j) The disruption of spacecraft function, communication, or data flow due to solar-shocks, energetic particle events, etc.

(k) Secondary disruptions of spacecraft function, communication, or data flow due to solar-shocks, energetic particle events, etc., including, but not limited to, failure of Global Positioning Systems (GPS), failure of air-traffic control systems, failure of cellular telephones, interruptions of television or radio broadcasts, etc.

(l) A change in the position of the equatorward edge of the auroral oval, its tailward displacement, and the polar cap potential.

(m) Intense and quiet SEP time profiles, peak flux, energy, fluence, etc.

(n) A radiation hazard to the International Space Station, astronauts, high-flying aircraft, etc.

(o) Any of the above disruptions at non-Earth locations. For example, the above disruptions could also take place on or near spacecraft (e.g. Intriligator, D. S. 1977, Pioneer 9 and Pioneer 10 observations of the solar wind associated with the August 1972 events, Journal of Geophysical Research, 82, 603–617), comets (e.g. Intriligator, D. S. and Dryer, M. 1991, A Kick from the Solar Wind as the Cause of Comet Halley's February 1991 Flare, Nature, 353, 407–409), or other planets (e.g. Intriligator, D. S. and Smith, E. J. 1979, Mars in the Solar Wind, Journal of Geophysical Research, 84, 8427; Intriligator, D. S. 1985, New Results on the Pioneer Venus Orbiter Feb. 10–12, 1982 Events: A Solar Wind Disturbance Not a Comet, Geophysical Research Letters, 12, 187–190).

(p) Any of the above at a defined position (e.g., geographic, magnetospheric, environmental, interplanetary, planetary, etc.) and at that position its onset, duration, severity, peak flux, intensity, etc.

FIG. 1 shows the basic hardware setup of an embodiment of the present invention. Computer 100 and storage device 101 contain the software and data that perform the functions of the space weather prediction system of the present invention. Computer 100 may also be connected to one or more sources of data such as (but not limited to):

a) either direct or indirect connection to a data stream from an instrument or spacecraft 102, such as GOES, STEREO, WIND, or ACE, that measure energetic particles, b) a network 103, such as the Internet, an intranet, or other high-speed datalink (e.g. to NOAA's Space Environment Center, which provides frequently updated information on energetic particle measurements), c) ground-based observatories 104, d) historical archives 105 (for, e.g., testing purposes), such as the archives at the National Geophysical Data Center, e) a keyboard 106, enabling entry of data by a human computer operator, f) a source of model-generated data 107.

In a preferred embodiment, forecasts are based on complex patterns of SEP data and optionally solar event data associated with a space weather event or with quiet conditions (i.e., a non-event) and optionally on the phase of the solar cycle. Energetic particle data are often measured in different energy-ranges. Typically, these energy ranges include: >1 Mev, >2 Mev, >4 MeV, >10 MeV, >30 MeV, and >60 Mev. Within each energy range a measurement is made of the energetic particle flux, i.e., the number of particles arriving per square centimeter per steradian per second. The embodiments described below can operate on any or all of these energy ranges or, alternatively, on any combination or derived energy ranges (e.g. 2–5 MeV, log (4–10 MeV), Fourier components of 2–5 MeV, or other measured, simulated, or derived energy ranges or distributions). Additionally, other energetic particle data, such as species (3He, 4He, Fe, O, etc.) or species ratios (e.g. 3He/4He, etc), could also be used.

In addition to SEP data, there are many kinds of solar data that can be used either on their own, as proxies for SEP data, or to complement SEP data. These additional kinds of data may include, but are not limited to, changes in intensity, frequency, polarity, location, and/or direction of solar-surface magnetic field structures, coronal hole structures, x-rays or radio waves, helioseismology parameters, filament or arcade structures, etc. Also, interplanetary proxies (such as waves or other phenomena generated by shocks in transit) can be used.

TEMPLATE-BASED EMBODIMENT

The template-based embodiment has two stages. In the first stage, templates are created, for example, through the process illustrated in FIG. 5 or a similar process illustrated in FIG. 6. In the second stage, the invention generates predictions by comparing new data to the templates, as illustrated in FIG. 7.

Figure 2:
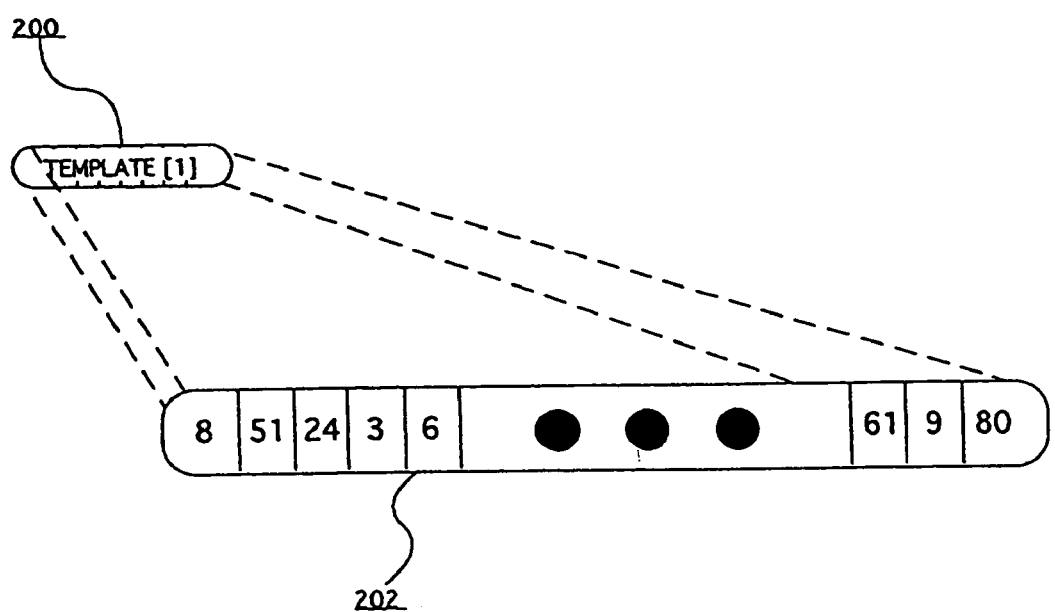
FIG. 2 illustrates the structure of a TEMPLATE element.

As shown in FIG. 2, each TEMPLATE 200 is an ordered series (e.g., a vector or array) of values 202. (Unless otherwise stated, the data provided in the figures and description herein are for illustrative purposes only and do not reflect actual data measurements.) Values 202 may be, for example, the flux of SEPs in a particular energy range. Each template 200 may comprise, for example, between 3 and 300 elements. The number of elements may vary depending on, among other factors, the variable(s) being used to generate predictions and the CRITERIA used for the TEMPLATE generation, as discussed below.

In a preferred embodiment, each TEMPLATE also can be tagged with information regarding the phase of the solar cycle at the time the data in the TEMPLATE were collected.

TEMPLATES can be created, for example, based on time-locking to a solar event (e.g. the time of an optical flare or x-ray burst is taken as time zero) or time-locking to a space weather disturbance (e.g. the time when Ap first exceeded 30 is taken as time zero). The process of TEMPLATE creation is almost identical in the two cases. The main difference is the data that are included in the TEMPLATES and how subsequent space weather predictions are made. If time-locking is based on a solar event then SEP or other data near (i.e., before, during, and/or after) the solar event are included in the TEMPLATES. If, on the other hand, time-locking is based on a space weather disturbance, then, although data near the space weather disturbance may still be included in the TEMPLATES, it is particularly the SEP or other data preceding the disturbance that are included.

Figure 3:
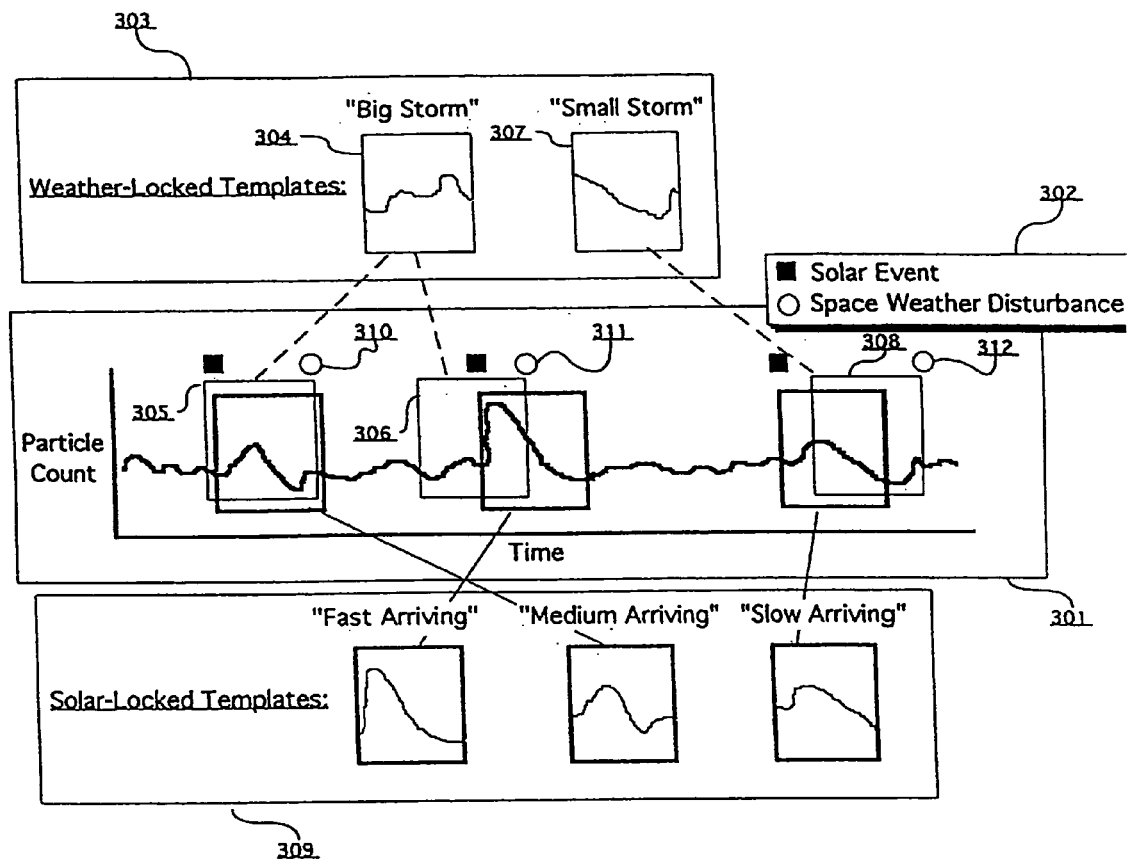
FIG. 3 is a representation of a solar event locked and a space weather disturbance locked TEMPLATE.

These time-locking approaches are illustrated in FIG. 3. In center panel 301, hypothetical particle data are shown over a time interval for a particular phase of the solar cycle. The data shown are entirely hypothetical and are for illustrative purposes only. The legend 302 identifies the two types of markers used in FIG. 3—squares represent solar events, e.g. flares; circles represent space weather disturbances, e.g. sudden commencements. In this illustration, space weather disturbances 310 and 311 are big storms and space weather disturbance 312 is a small storm. The upper panel 303 illustrates two TEMPLATES time-locked to space weather disturbances, taking the data preceding the disturbance for inclusion in the templates. In this illustration, the first template 304 represents the average particle activity before a large storm, derived by averaging the data preceding 310 and 311 (i.e., the data in boxes 305 and 306). The second template 307 represents the average particle activity before a small storm, in this case the data preceding disturbance 312. In a preferred implementation, the templates will typically be based on a large number of samples and thus will better characterize the data representative of a specific type of space weather event or with a non-event for a particular phase of the solar cycle.

The lower panel 309 illustrates three TEMPLATES that could be created based on time-locking to solar events and taking subsequent data for inclusion in the TEMPLATES. In this case, the three templates are associated with, again for illustrative purposes, the "time to space weather disturbance" for a particular phase of the solar cycle. Once again, in a preferred implementation, the templates would be based on a large number of samples.

Creating Solar-Event-Locked Templates

Figure 5:
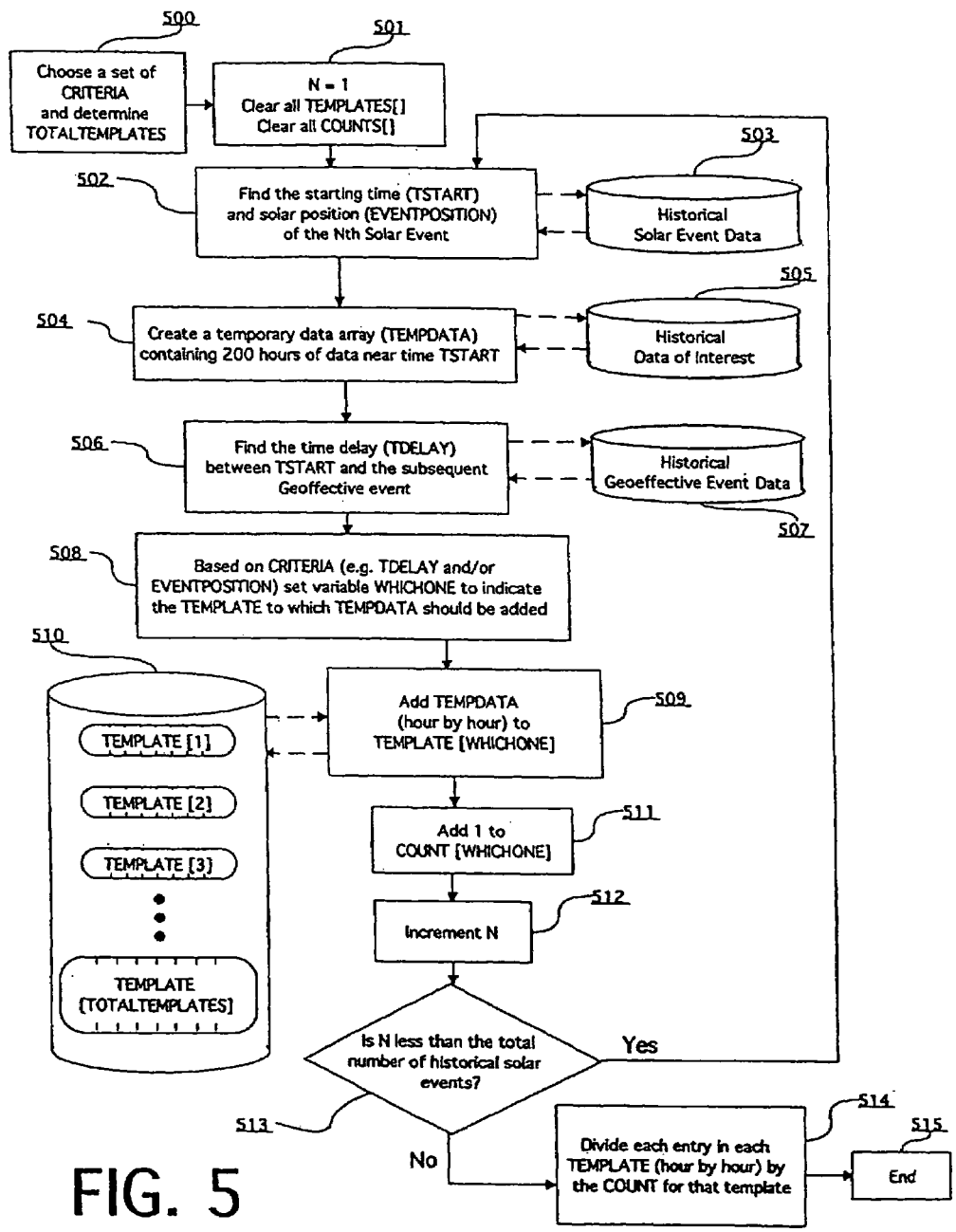
FIG. 5 is a flowchart of the software that creates the historically derived templates time-locked to solar events.

FIG. 5 illustrates the process through which a variable number of TEMPLATES are created based on time-locking to solar events. In step 500 a set of CRITERIA is chosen. This set of criteria determines the information that will be represented in each template and can be chosen in any of a number of ways. For example, one set of CRITERIA may be to classify storms into three categories based on the severity of the associated space storm (e.g., mild, intermediate, or severe). A different set of CRITERIA may be to classify solar events based on their longitude of origin (e.g. east, central, west). A different set of CRITERIA may be to classify storms into three categories based on storm duration (e.g. short, intermediate, or long duration). Yet another set of CRITERIA may be to classify storms based on their speed of arrival (e.g. fast arriving, medium arriving and slow arriving, where a fast arriving storm arrives, e.g., within 40 hours of the solar event that caused it, a medium arriving storm arrives between 41 and 80 hours and a slow arriving storm arrives more than 80 hours later). Sets of CRITERIA can be created to address any of the characteristics of space weather disturbances, including the onset time, duration, severity, position and many other parameters associated with the space weather disturbances described above. For example, another set of CRITERIA might be created to predict different size auroral ovals or other geographical regions (e.g., third radiation belt, particle fluence at the International Space Station, etc.). Additionally, multiple (or even time-varying) sets of CRITERIA and TEMPLATES may be chosen and used in parallel.

Figure 4:
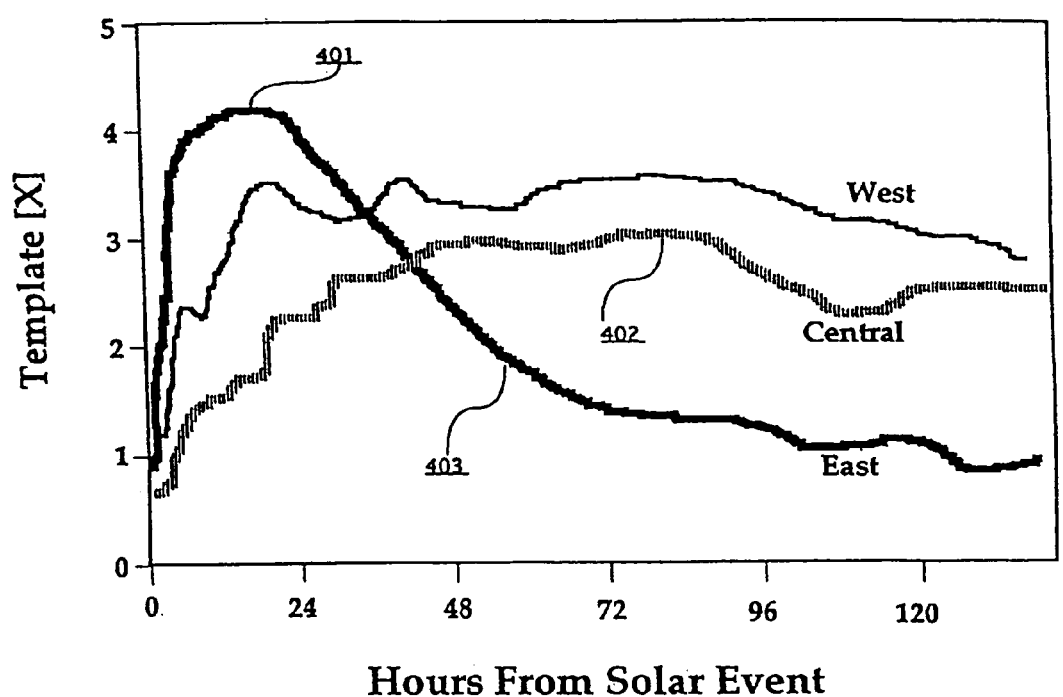
FIG. 4 is a graphical representation of three TEMPLATEs for a particular set of criteria.

The set of criteria determines the total number of templates (TOTAL TEMPLATES). Preferably, a separate template is created for each category in a set of CRITERIA for each phase of the solar cycle, i.e., a template contains a representation of data associated with the category for a particular phase of the solar cycle. In one embodiment, the set of criteria dictates that three templates are created (as shown in FIG. 4) for each phase of the solar cycle: template one (401) represents energetic particle and/or solar activity near the time that a solar event took place in the eastern longitudes of the sun (an "east" event), template two (402) represents activity near the time that a solar event took place in the central longitudes of the sun (a "central" event), and template three (403) represents activity near the time that a solar event took place in the western longitudes of the sun (a "west" event).

An alternate set of criteria could require nine templates for each phase of the solar cycle: for example, the "slow", "medium", and "fast" criteria mentioned above but each of these being further divided into three longitude-based templates (for example, there would be one template representing fast events that originated on the eastern regions of the sun, one representing fast events from the central regions of the sun, etc).

Alternatively, a template may comprise a plurality of sub-templates each associated with, for example, different types of data and/or data having a predetermined temporal relationship to data in other templates. For example, one sub-template might contain solar data before and/or during a solar event, such as x-ray, gamma, microwave, ultraviolet, etc. data, and another sub-template might represent energetic particle data during and/or following the solar event. In one embodiment, x-ray and SEP data are used in sub-templates to forecast the speed of arrival and intensity of a geomagnetic storm, including the peak particle flux.

The flowcharts described below can be easily adapted to process any of the above types of TEMPLATES.

In step 501, counter variable N is set to one and the TEMPLATES 510 (which are used to store running sums of values) are cleared to zero, as are the COUNTS (which are used to track the number of samples within each TEMPLATE).

Step 502 retrieves information regarding the Nth solar event (such as its starting time TSTART, its solar position EVENTPOSITION (i.e., where it occurred on the sun) and the phase of the solar cycle when it occurred) from a data store 503 that contains such historical information.

Step 504 fills a temporary data array, TEMPDATA (which has a format similar to the TEMPLATES illustrated in FIG. 2) by retrieving data identified in Step 502, for example, data for a time period near the time TSTART. In one embodiment, the routine takes two hundred hours of SEP data following the solar event—that is, it retrieves data for hours TSTART to (TSTART+200)—from data store 505 which contains such historical information. Alternatively, the routine might take 100 hours preceding the event and another 100 hours following the event, etc. In one preferred embodiment, 200 data values are taken such that (i) the first 100 samples are taken one-per-hour for the 100 hours following the event from one SEP energy range (e.g. flux>10 MeV) and (ii) the next 100 samples are taken one-per-hour for the 100 hours following the event from a different energetic particle energy range (e.g. flux>100 MeV). The invention however is not limited to a particular number of TEMPLATE elements, nor by a one-hour sampling, nor by the inclusion of any set number of particle measures (e.g. energy range, particle species, etc.), nor by the inclusion of a set number or type of solar measurements, nor by the chosen temporal window from which the data are collected, etc.

Step 506 determines the time TDELAY of the soonest geoeffective event after time TSTART by looking in a database 507 containing geoeffective event data. Typically, due to considerations of reasonable event speed, only events more than 20 hours and less than 120 hours are taken as viable candidates for the "soonest" event. Depending on the set of CRITERIA chosen in step 500, step 506 may be optional (e.g. if the CRITERIA does not use TDELAY as a basis for event classification and TEMPLATE generation).

Step 508 applies the CRITERIA condition to the relevant variables (e.g. TDELAY, EVENTPOSITION, solar cycle phase, etc.) and sets variable WHICHONE to indicate the template to which the TEMPDATA should be added.

In step 509 TEMPDATA is added to TEMPLATE[WHICHONE] on an hour by hour basis—i.e. hour 1 of TEMPDATA is added to hour 1 of TEMPLATE[WHICHONE], hour 2 of TEMPDATA is added to hour 2 of TEMPLATE[WHICHONE], and so on. After the data have been added, COUNT[WHICHONE] is incremented by one in STEP 511. In one preferred embodiment, COUNT[WHICHONE] has an additional dimension so that a count can be kept for each hour in each TEMPLATE. This additional dimension does not change the logic of the algorithm, but it does allow the routine to handle data gaps (in which case nothing is added to that particular element of the TEMPLATE and the COUNT[WHICHONE][HOUR] is not incremented). Furthermore, the additional dimension allows an operator to assign (either by eye or algorithm) a "confidence" measure to each element of TEMPDATA and adjust COUNT[WHICHONE][HOUR] accordingly. For example, if the first 21 hours of data following a solar event are clearly contaminated by a preceding storm (or a machine error) then these data can be kept out of the TEMPLATE and elements COUNT[WHICHONE][0] through COUNT[WHICHONE][20] would not be incremented.

In step 512, N (the counter used to index the Solar Event that is being examined) is incremented. In step 513, N is compared to the total number of historical solar events and if there are still more events to consider, control passes back to step 502. If all events have been considered, then step 514 is performed in which each TEMPLATE is divided by its respective COUNT (to yield averages). If, as mentioned above, there is an additional dimension to the COUNT array, then each element of each TEMPLATE is divided by its respective COUNT (on an entry-by-entry basis). The process then ends in step 515 at which point the TEMPLATES have been created.

Creating Space-Weather-Locked Templates

Figure 6:
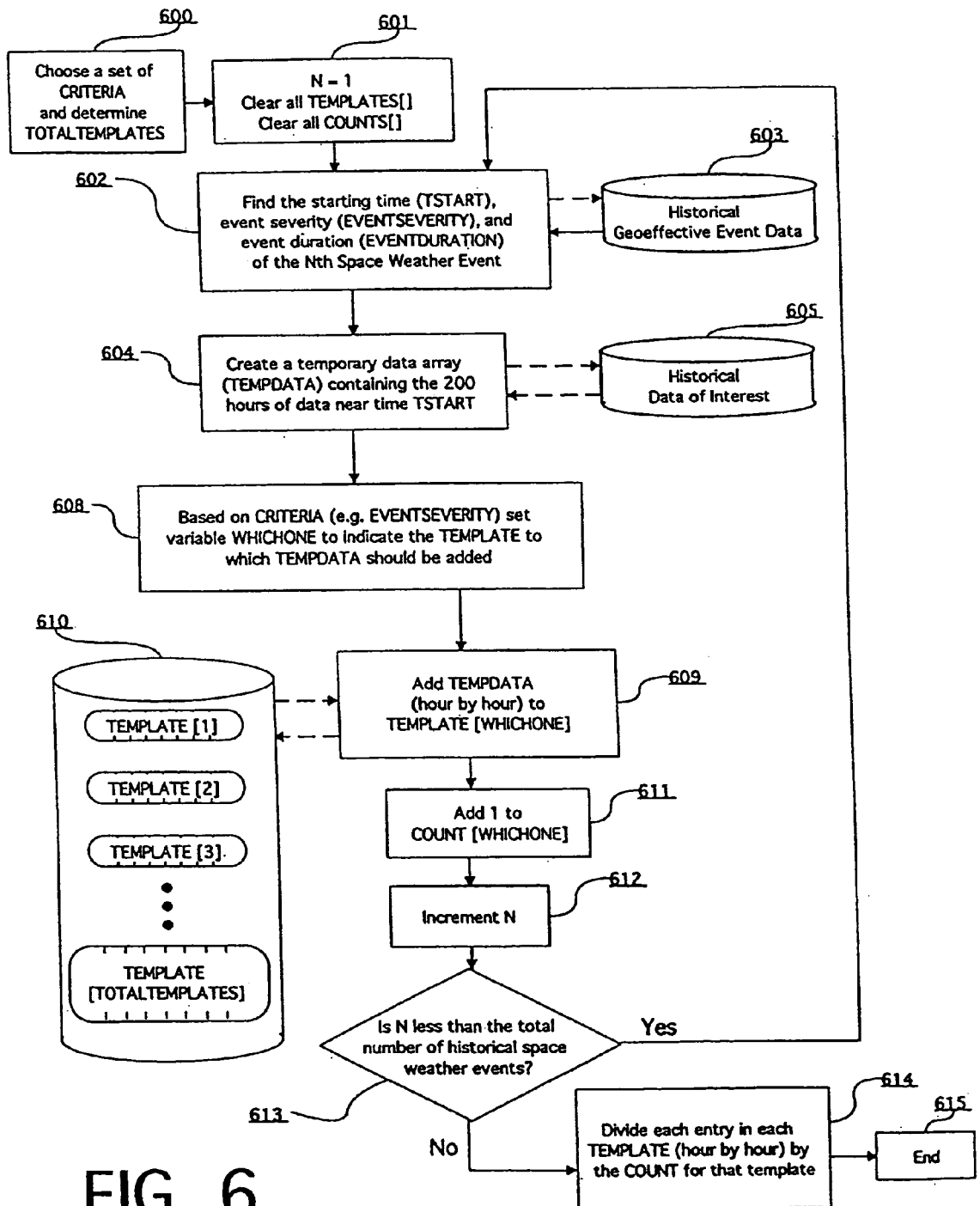
FIG. 6 is a flowchart of software that creates historically derived templates time-locked to space weather disturbances.
Figure 7:
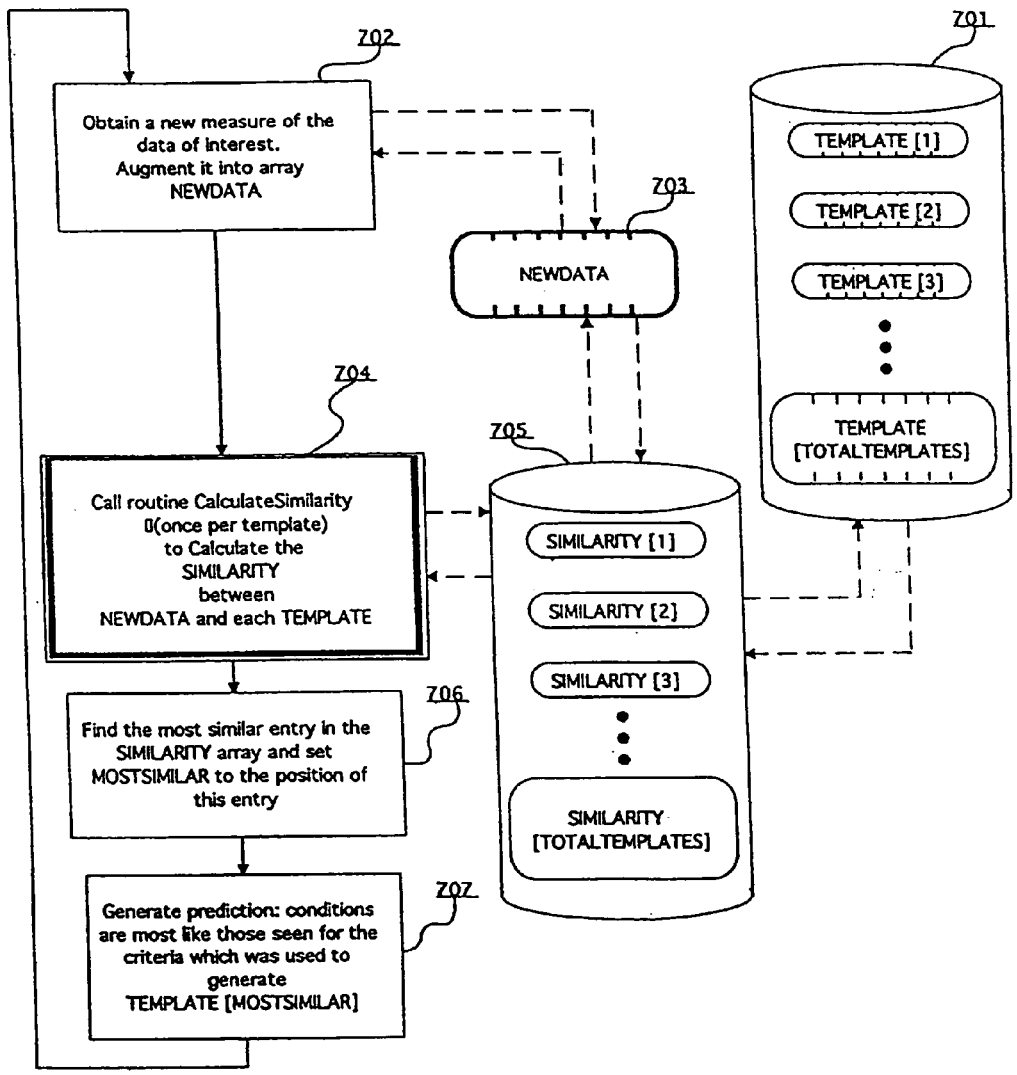
FIG. 7 is a flowchart of software that predicts the onset of a solar-induced event based on comparisons of incoming SEP and/or solar data with historically-derived templates.

FIG. 6 illustrates the process through which a variable number of TEMPLATES are created based on time-locking to a space weather disturbance. In step 600 a set of CRITERIA is chosen. Again, this set of criteria determines the information that will be represented in each template and can be chosen in any of a number of ways as described in connection with FIG. 5 above.

The set of criteria again determines the total number of templates (TOTALTEMPLATES). Templates may be created which represent average activity both before and after an event—the 'after the event' data may be useful for predicting phenomena such as the lowering of the ionosphere, the creation of radiation belts, etc.

In step 601, counter variable N is set to one and TEMPLATES and COUNTS are cleared to zero.

Step 602 retrieves information regarding the Nth space weather disturbance (such as its starting time TSTART, the severity of the disturbance, EVENTSEVERITY, the duration of the disturbance, EVENTDURATION, and/or the phase of the solar cycle at the time of the disturbance) from a data store 603 that contains such historical information.

Step 604 fills a temporary data array, TEMPDATA, by retrieving historical data of interest for a time interval near TSTART. For example, this step might include the two hundred hours of SEP data and solar data preceding the space weather disturbance (that is, for example, it retrieves data for hours (TSTART−200) to TSTART from a data store 605 containing such historical information. In one preferred embodiment, the 200 samples are taken such that: (i) the first 100 samples are taken one-per-hour from one SEP energy range (e.g. flux>10 MeV), and (ii) the next 100 samples are taken one-per-hour from a different SEP energy range (e.g. flux>100 MeV). Again, the invention is not limited by this particular number of TEMPLATE elements, nor by the one-hour sampling, nor by the inclusion of any set number of SEP or solar measures.

Step 608 applies the CRITERIA condition to the relevant variables (e.g. EVENTSEVERITY or EVENTDURATION) and determines the template to which the TEMPDATA should be added. Variable WHICHONE is set accordingly.

In step 609, TEMPDATA is added to TEMPLATE[WHICHONE]. This addition happens hour by hour such that hour 1 of TEMPDATA is added to hour 1 of TEMPLATE[WHICHONE], hour 2 of TEMPDATA is added to hour 2 of TEMPLATE[WHICHONE], and so on. After the data have been added, COUNT[WHICHONE] is incremented by one in step 611. In one preferred embodiment, COUNT[WHICHONE] has an additional dimension as described in connection with FIG. 5 so that a count can be kept for each hour in each TEMPLATE.

In step 612, N (the counter used to index the space weather disturbance that is being examined) is incremented. In step 613, N is compared to the total number of historical space weather disturbances and if there are still more disturbances to consider, control passes back to step 602. If all disturbances have been considered, then step 614 is performed in which each TEMPLATE is divided by its respective COUNT (to yield averages). If, as mentioned above, there is an additional dimension to the COUNT array, then each element of each TEMPLATE is divided by its respective COUNT (on an entry-by-entry basis). The process then ends in step 615 at which point the space weather disturbance locked TEMPLATES have been created.

Generating Predictions Using the Templates

Once the set of TEMPLATES has been created, these TEMPLATES can be used to generate space weather predictions. New data are compared to the TEMPLATES for the current phase of the solar cycle and whichever TEMPLATE is most similar is then used to generate a prediction. If, for example, the new data are most similar to the TEMPLATE representing a severe storm, a warning will be issued that a severe storm may be approaching.

FIG. 7 illustrates the process by which such predictions are generated. In step 702 new measures of SEP or other activity are obtained from one of the data sources depicted in FIG. 1 (spacecraft 102, internet 103, ground-based observatories 104, data storage 105, human entry 106, or models 107). The value (or values) are then stored in a data array, NEWDATA, 703. Each new data value is shifted into NEWDATA array 703—i.e., the first value in NEWDATA is removed, all the entries in NEWDATA are shifted "forward" one position (thus the second value will fill the position previously occupied by the first value, etc.), and then the newest value is placed into the newly-vacated "last" position in the NEWDATA array. Alternatively, if the TEMPLATES contain sub-divisions (e.g. the first 50 values are from a different energy range than the next 50 values), then the storage of new data takes place in the same fashion within each sub-division.

Figure 8:
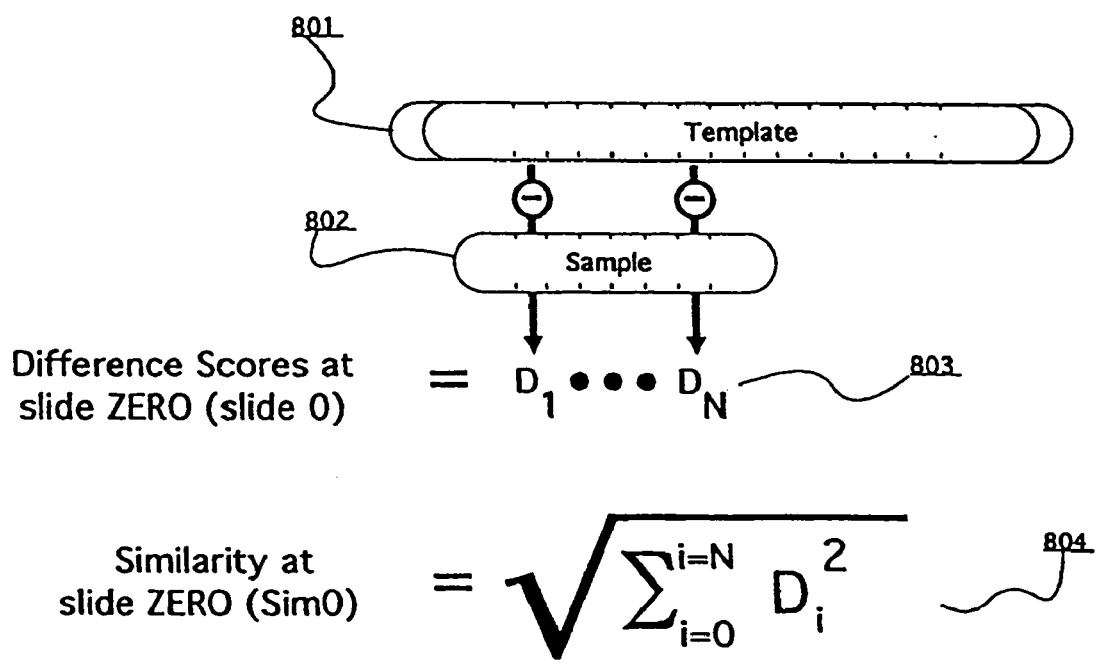
FIG. 8 depicts a type of similarity measure (Euclidian Distance calculations) that can be used when predicting solar-induced events.
Figure 9:
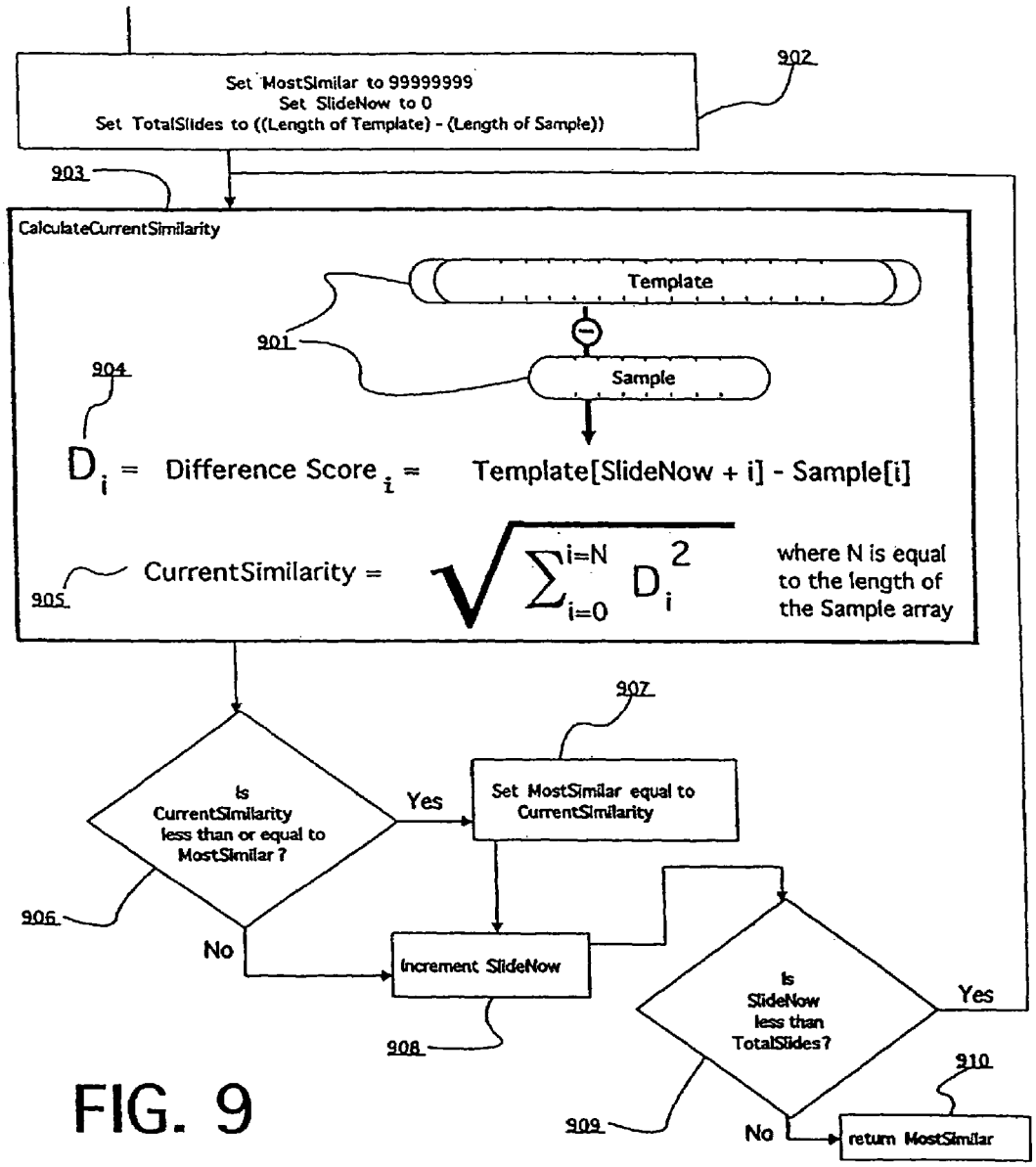
FIG. 9 illustrates a general subroutine implementing one type of similarity measure (Euclidian Distance calculations) that can be used when predicting solar-induced events.

Processing continues in step 704, which calculates a SIMILARITY measure between NEWDATA and each of the TEMPLATES for the current phase of the solar cycle. The SIMILARITY measures 705 can be calculated, for example, in any of the following ways:

by calculating the Euclidean distance between NEWDATA and each TEMPLATE (as illustrated in FIGS. 8 and 9), by calculating the well-known Pearson correlation-coefficient between NEWDATA and each TEMPLATE, by calculating the variance-covariance similarity between NEWDATA and each TEMPLATE (a statistical technique which is well-known by those skilled in statistics and which takes into account not only the average values in each template, but also the standard deviations or variances of these values across template elements), by using any conventional recognition/comparison algorithm (such as neural networks or other statistical metrics).

Once all the SIMILARITY measures are obtained, processing continues at step 706, which sets the variable MOSTSIMILAR to the most similar entry (either the greatest or smallest value depending on the technique used to calculate the SIMILARITY scores).

The variable MOSTSIMILAR indicates which TEMPLATE is most similar to the current NEWDATA sample. In step 707, a prediction is generated. This prediction will, for example, be of the form: "Current conditions are most like those that are represented by [TEMPLATE[MOSTSIMILAR]]." Using the "fast", "medium", and "slow" CRITERIA mentioned above, the prediction could be expressed more idiomatically as: "WARNING: Current conditions are most like a FAST arriving event—expect a geoeffective event within the next 40 hours!" Once this prediction has been generated, control passes back to step 702. This process remains the same for both time-locking to space weather disturbances and solar events, though the nature of the prediction may be different. Alternatively, (i) a prediction may be generated only if it differs from the last prediction generated, (ii) the prediction may be based on some number of previous predictions or (iii) the prediction may be based on the most severe of some number of previous predictions.

After a prediction has been generated and some time has passed, it is possible to evaluate the accuracy of the prediction and dynamically modify the forecasting system. This can happen in several ways. In one way, as more data are obtained which fit one of the TEMPLATE criteria, the new data are added into the TEMPLATE representation(s) (i.e. as, over time, "new data" become "historical data", they are added into the historically-derived templates). Other, more complex, techniques for dynamic system modification are possible. For example, if a prediction is generated and, in hindsight, it is found to be incorrect, the TEMPLATE representation that led to the poor prediction may be examined and the data most responsible for issuing the prediction identified. These data can then either be modified or, alternatively, they could be flagged as "problematic." Through such flagging, the confidence of future predictions that rely on these data could be lowered.

A Sample Similarity-Calculation Subroutine

FIG. 8 depicts a calculation of Euclidian distance which can be used as a similarity score. Again, one skilled in the art will appreciate that many other techniques can be used to obtain a similarity measure. Numeral 801 identifies a TEMPLATE to which a new sample 802 will be compared. For each element in the sample (1 through N, where N is the length of the sample), a difference score 803 is obtained. This difference score is simply the difference between each sample element and the matching (or respective) element in the TEMPLATE. Once these difference scores have been calculated, the measure of similarity 804 is obtained by squaring all the difference scores and then summing them (and taking the square root of this sum of squared differences).

FIG. 9 depicts an alternative embodiment which compensates for situations in which the data at the beginning of a TEMPLATE are not in fact associated with the CRITERIA. To compensate for this situation, the samples (or, equivalently, the TEMPLATES) may be "slid" through time to find the best match. In step 902, variable MostSimilar is set to a very large number (here shown as 99999999), variable SlideNow is set to zero, and TotalSlides is set to ((Length of Template)–(Length of Sample)). In step 903, a set of difference scores 904 is obtained and the CurrentSimilarity 905 is calculated.

The value of CurrentSimilarity is then compared in step 906 to MostSimilar and, if it is smaller (e.g., a closer Euclidian distance), MostSimilar is set equal to CurrentSimilarity in step 907. In either case, step 908 is performed in which SlideNow is incremented. SlideNow is then compared to TotalSlides in step 909 and, if there are more slides remaining, control passes back to step 903. Once all the slides have been completed, the routine returns the value MostSimilar 910. The value of MostSimilar will, upon completion of the routine, be the smallest Euclidian distance between the Sample and the Template across all possible temporal slides.

In another embodiment, the well-known statistical technique of variance-covariance distances is used to calculate the MostSimilar value. In this technique, when the TEMPLATES are initially created (via averaging the individual samples), it is not only the average values that are saved, but also a measure of the variance at each point in time. The routine shown in FIGS. 8 and 9 can then use the variance-covariance technique to compare a new sample (i.e. the NEW DATA) to each of the TEMPLATES. Similarly, other measures of confidence, certainty, or reliability can be used (e.g., agreement with previous predictions, etc.). For example, confidence levels can be determined by the percentage of previous instances of similar observations and forecasts that turned out to be valid. Thus, if 90% of the time, previous forecasts turned out to be accurate, then the degree of confidence could be 90% (or, equivalently, 0.9). However, unlike the Euclidian method that simply returns the Euclidian distance between the new sample and the average, the variance-covariance technique returns this distance in terms of the number of standard deviations from the average. Therefore, the variance-covariance technique is essentially a multi-dimensional generalization of such standard statistical techniques as the well-known t-test statistic. This technique generates similarity estimates that take into account not only the average data, but also the dispersion of the data and therefore it tends to give somewhat better estimates.

Because a numerical calculation is used to compute the similarity between the new data and the stored representations, it is possible to obtain confidence measures of each prediction. For example, the variance-covariance method returns the number of standard deviations from a template. This can be used as a measure of confidence of the prediction. In particular, if the current data are only 0.01 standard deviations from the most similar template representation, then the system has more confidence in the prediction than if the data were 12.8 standard deviations from the most similar template. Such measures of confidence could either be displayed along with the warning or, as is often the case, if the template-prediction is a part of a larger (hybrid) forecasting system (e.g. if several sets of templates are operating in parallel, or if the templates are operating in parallel to a neural network such as described below), then the weight of each template in the final prediction could be a function of the calculated prediction-confidence.

A Sample Hybrid Template-Based System

Figure 10:
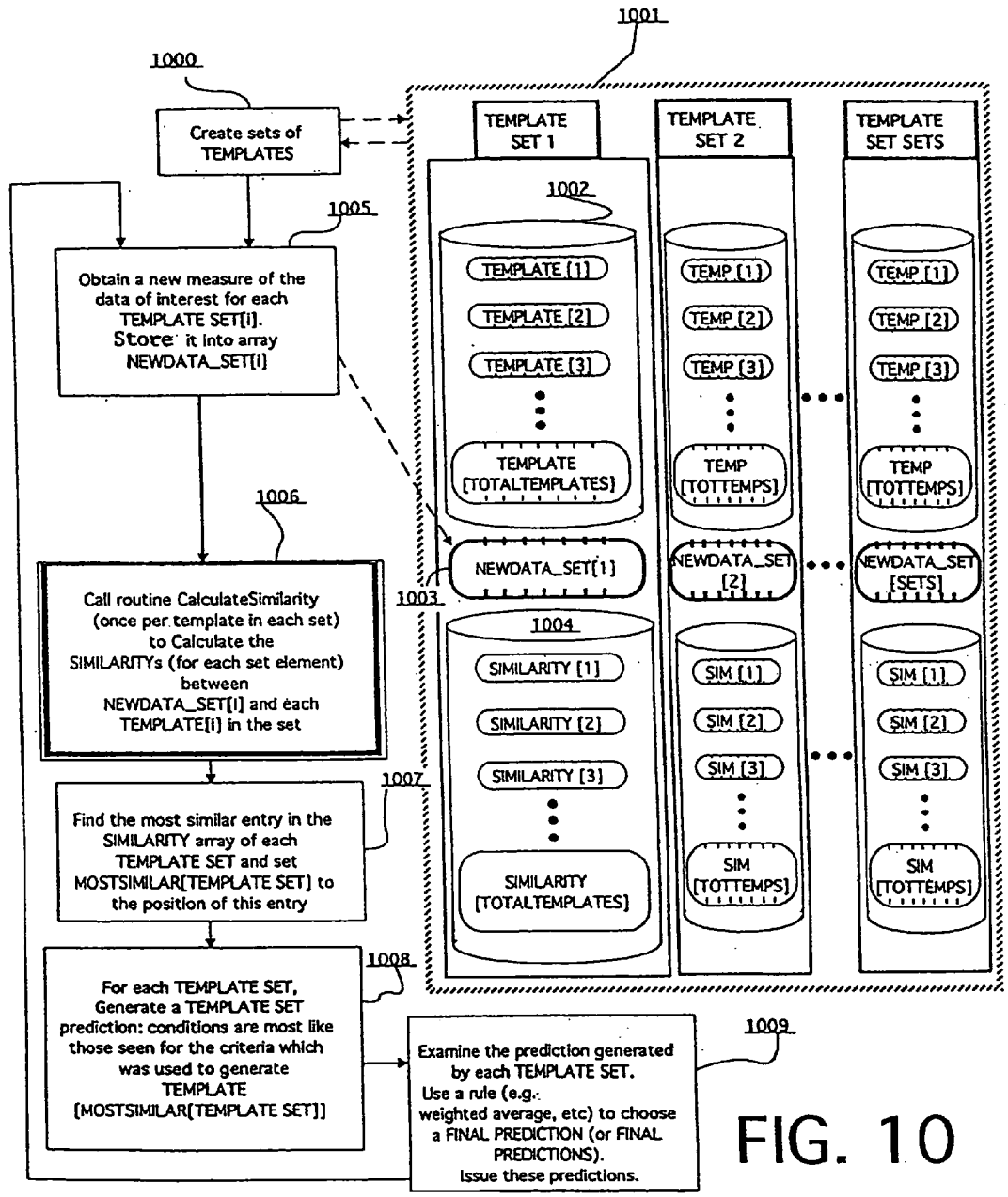
FIG. 10 illustrates a hybrid space weather prediction system where information from both solar-locked and storm-locked templates are combined to increase forecast accuracy.

FIG. 10 illustrates how a hybrid template system operates. Such a system is designed to use multiple sets of TEMPLATES, each operating in parallel, to increase forecasting accuracy. For example, it might use three types of solar-event-locked and two types of space-weather-disturbance-locked TEMPLATES to generate space weather predictions about both storm onset and storm properties (e.g. severity and duration). Alternatively, the TEMPLATES in one embodiment include a TEMPLATE for x-ray data and a TEMPLATE for SEP data. The TEMPLATES may also be associated with temporally separated data with, for example, data in an x-ray data TEMPLATE being earlier in time than the data in the SEP data TEMPLATE.

In step 1000, a variable number of TEMPLATE SETs 1001 are created. Each TEMPLATE SET has associated with it a variable number of TEMPLATES 1002, an array into which new data are stored 1003, and a variable number of SIMILARITY measures 1004. As new data are obtained in step 1005, the appropriate values are stored in each NEWDATA_SET. Next, in step 1006, for each TEMPLATE SET, each NEWDATA_SET[i] is compared to the corresponding TEMPLATE[i] and similarity measures are obtained 1006. In step 1007, the SIMILARITY measures are examined for each TEMPLATE SET and position [TEMPLATE SET] of the array MOSTSIMILAR is set to the most similar TEMPLATE. After step 1007 is complete, the array MOSTSIMILAR will indicate, for each TEMPLATE SET, which TEMPLATE in that SET is most similar to the new data. In step 1008, for each TEMPLATE SET, a prediction is generated based on the MOSTSIMILAR array. At this point, the algorithm has many possible predictions and it must choose a FINAL PREDICTION to issue in step 1009. This FINAL PREDICTION may be generated in any number of ways. For example, if all the TEMPLATE SETS are generating arrival-time predictions (e.g. based on solar-event locked data), then the FINAL PREDICTION could be either an average of each TEMPLATE SETS prediction or, in another embodiment, the "worst case" prediction is generated (i.e. the shortest arrival time prediction is output). Alternatively, if the variance-covariance similarity measure is used, then the distances (in standard deviations) can be used to choose between multiple predictions. Similarly other measures of confidence, certainty or reliability can be used (e.g., agreement with previous predictions, etc.). However, if some of the TEMPLATE SETS are estimating arrival time (e.g. based on solar-locked TEMPLATES) and others are estimating solar disturbance intensity, then two separate predictions might be generated. In general, the logic of this FINAL PREDICTION step 1009 will be based on the particular TEMPLATES within the TEMPLATE SETS.

In one preferred embodiment, multiple templates are created as described above. However, in this embodiment, multiple sets of templates are created for specific starting conditions. For example, one set of templates is created based on historical data taken from periods of high solar activity (e.g. during solar max). A separate set of templates is created based on historical data taken from periods of low solar activity (e.g. during solar min). Once these multiple sets have been created, current predictions are made by comparing current data to the elements in the appropriate template set. By using this dynamic approach to weather prediction (wherein the particular templates used are a function of recent or cyclical variations in activity, such as, but not limited to, the phase of the solar cycle) the overall accuracy of the forecasts is increased. Similar multiple sets of templates are created for other starting conditions as well (e.g. a template set could be created that represents activity following a large solar flare, or following large x-ray bursts, etc.). In essence, this approach is an extension of the CRITERION discussed in the template-creation phase. However, instead of the CRITERION being applied to all data, this "STARTING CONDITION CRITERIA" is used as a first-filter which allows a template-set to be created for specific starting conditions.

EXPERT SYSTEM EMBODIMENT

In this embodiment, an expert system is used to recognize complex patterns in SEP and other data indicative of particular types of space weather disturbances for a particular phase of the solar cycle. For example, a "peak" in energetic particle activity, i.e., a time-varying pattern that goes, roughly speaking, low-high-low, with characteristics possibly dependent on the current phase in the solar cycle may indicate the approach of a geomagnetic storm.

Figure 11:
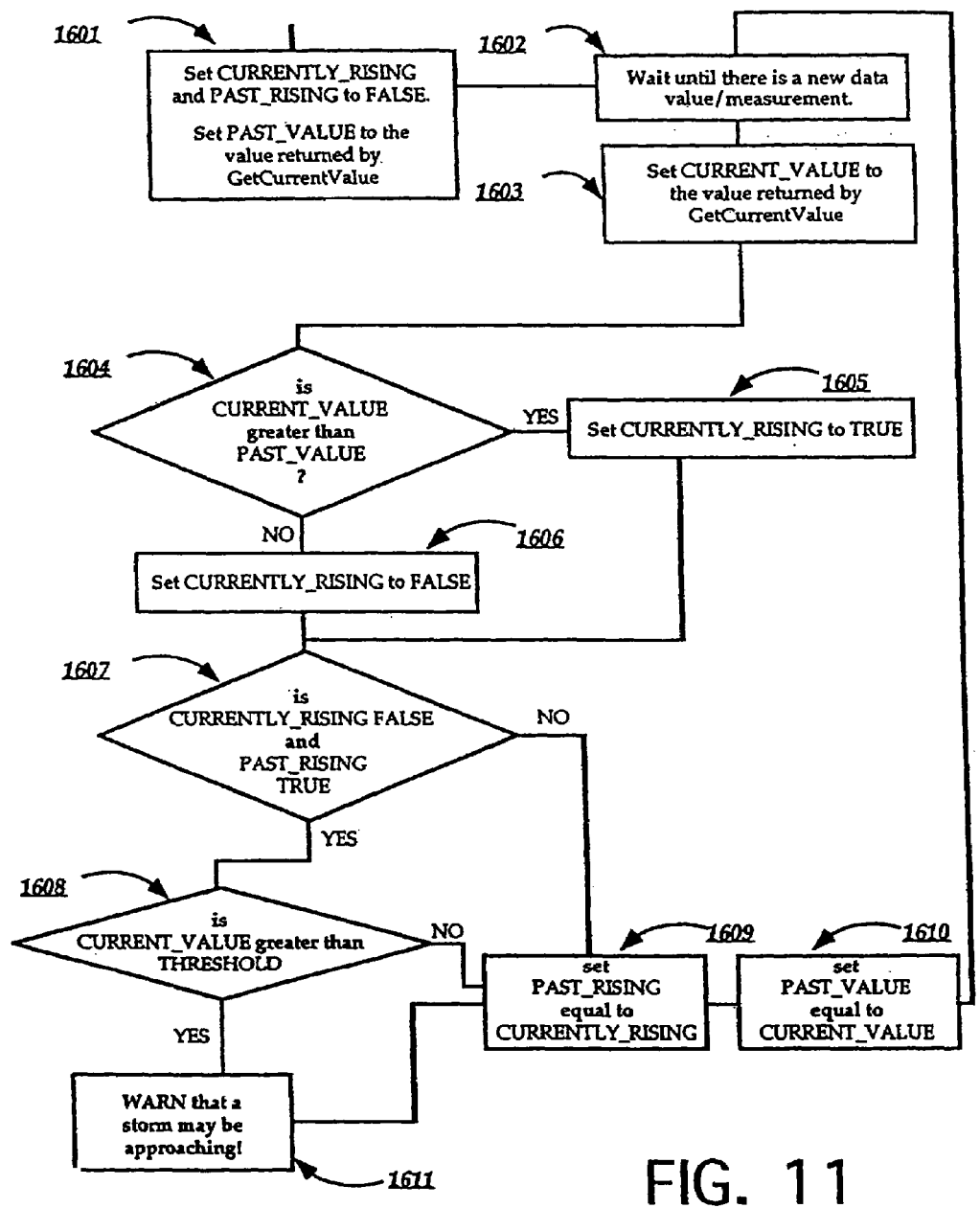
FIG. 11 is a flowchart of software for an expert system that generates space weather predictions.

Referring to FIG. 11, the variables CURRENTLY_RISING and PAST_RISING are initially set to zero in step 1601. All energetic particle and other data values are returned by a routine called GetCurrentValue (described below). Initially, the data value returned from that routine is stored in PAST_VALUE (step 1601).

In step 1602, the process pauses until a new data value or measurement has been acquired. These values can be obtained from, for example, any of the sources indicated in FIG. 1. The data may include, e.g., SEP data, measures of x-ray intensity, measures of magnetic field components, helioseismologic parameters, optical data, etc.

As noted above, SEP data are often measured in different energy-ranges, e.g., >1 Mev, >2 Mev, >4 MeV, >10 MeV, >30 MeV, and >60 Mev. Within each energy range a measurement is made of the number of particles arriving per square centimeter per steradian per second. The present algorithm can operate on any or all of these energy ranges or, alternatively, on any combination or derived energy ranges (e.g. 2–5 MeV, log(4–10 MeV), Fourier components of 2–5 MeV, etc.).

Once new data values are obtained, CURRENT_VALUE is set to the value returned by GetCurrentValue (step 1603). CURRENT_VALUE is then compared to PAST_VALUE (step 1604). If the current value is larger than the PAST_VALUE then CURRENTLY_RISING is set to true (step 1605), otherwise CURRENTLY_RISING is set to false (step 1606). Next, the occurrence of a peak is determined by checking if CURRENTLY_RISING is FALSE and PAST_RISING is TRUE (step 1607). If this is the case, then the CURRENT_VALUE is compared to THRESHOLD (step 1608). If CURRENT_VALUE is greater than the THRESHOLD value then a storm is predicted to occur sometime within the next 72 hours (step 1611). THRESHOLD value is selected based on the type of data being analyzed and possibly on the current phase of the solar cycle. In addition, multiple versions of the routine illustrated in FIG. 11 may be run on different SEP and solar data and a storm may be predicted based on the results of these multiple routines. For example, in one embodiment, a storm is predicted based on the detection of a rise in x-ray data above a certain THRESHOLD or a peak in the x-ray data above a certain THRESHOLD followed by a rise or peak in SEP again above a certain THRESHOLD. Next, PAST_RISING is set to CURRENTLY_RISING (step 1609) and PAST_VALUE is set to CURRENT_VALUE (step 1610). Operation is then passed back to step 1602.

Figure 12:
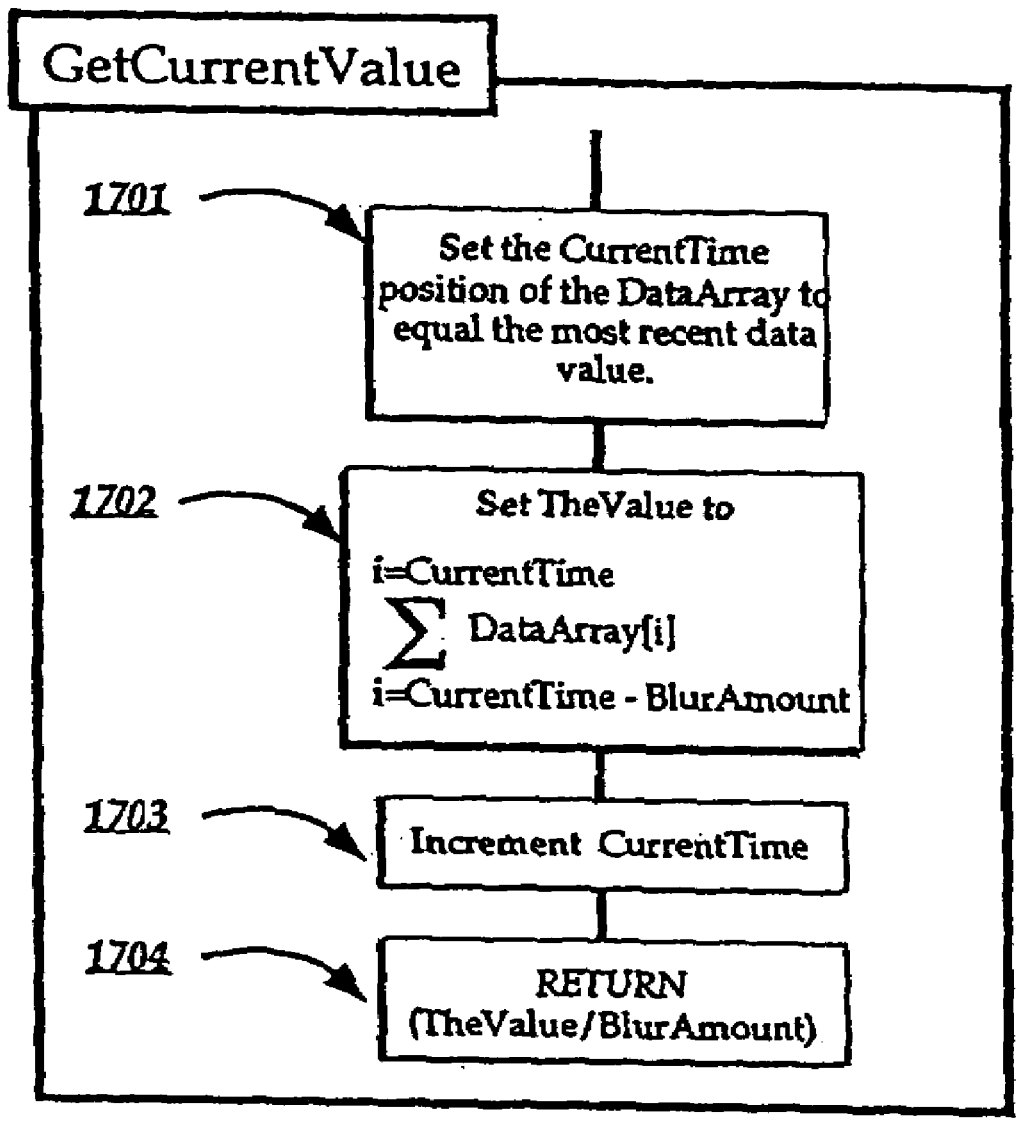
FIG. 12 is a flowchart of the GetCurrentValue routine that is used by the peak-finding expert system.
Figure 13:
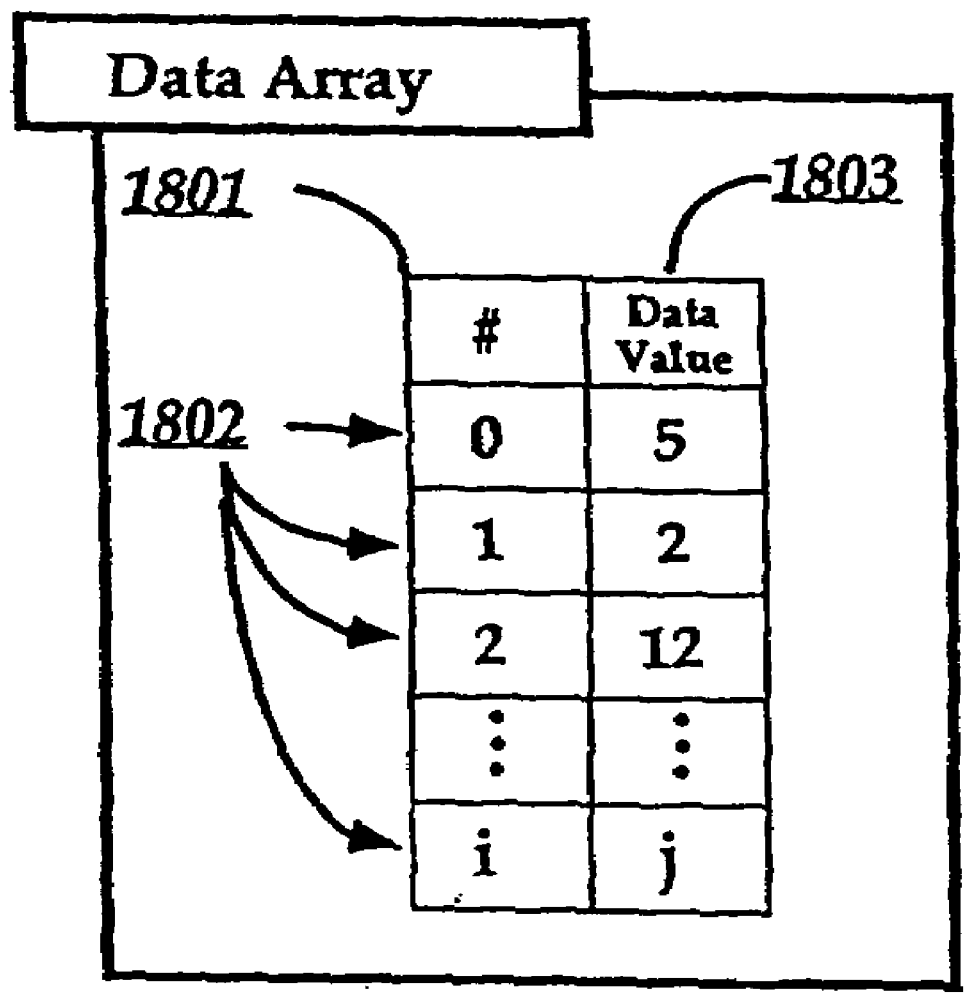
FIG. 13 depicts a data array that is used to store data (SEP, solar, etc.) for the peak-finding expert system.

The routine GetCurrentValue is illustrated in FIG. 12 and uses three variables/datastructures: DataArray, CurrentTime and BlurAmount. DataArray is an array similar to that shown in FIG. 13. Each element in array 1801 contains an index number 1802 and a data value 1803. The data values 1803 stored in this array may be, for example:

1) measurements of the entire energy range (e.g. 0–10,000 MeV), 2) a bandpass region from such measurements as in 1, or 3) a linear or nonlinear combination of such measurements as in 2.

CurrentTime is a value which is used to increment the index to DataArray. BlurAmount is used to indicate how many data values should be averaged together before returning a value. In FIG. 12, the averaging is implemented as a simple unweighted averaging. However, it should be understood that any weighted form of averaging can be used here.

The routine GetCurrentValue operates as follows. In step 1701, the element of the DataArray at index CurrentTime is set to the most recent data value. Next, in step 1702, the variable TheValue is set to the sum of the BlurAmount most recent data values. Then the variable CurrentTime is incremented (step 1703). Finally, the routine returns TheValue divided by BlurAmount (i.e. the average) (step 1704).

Figure 14:
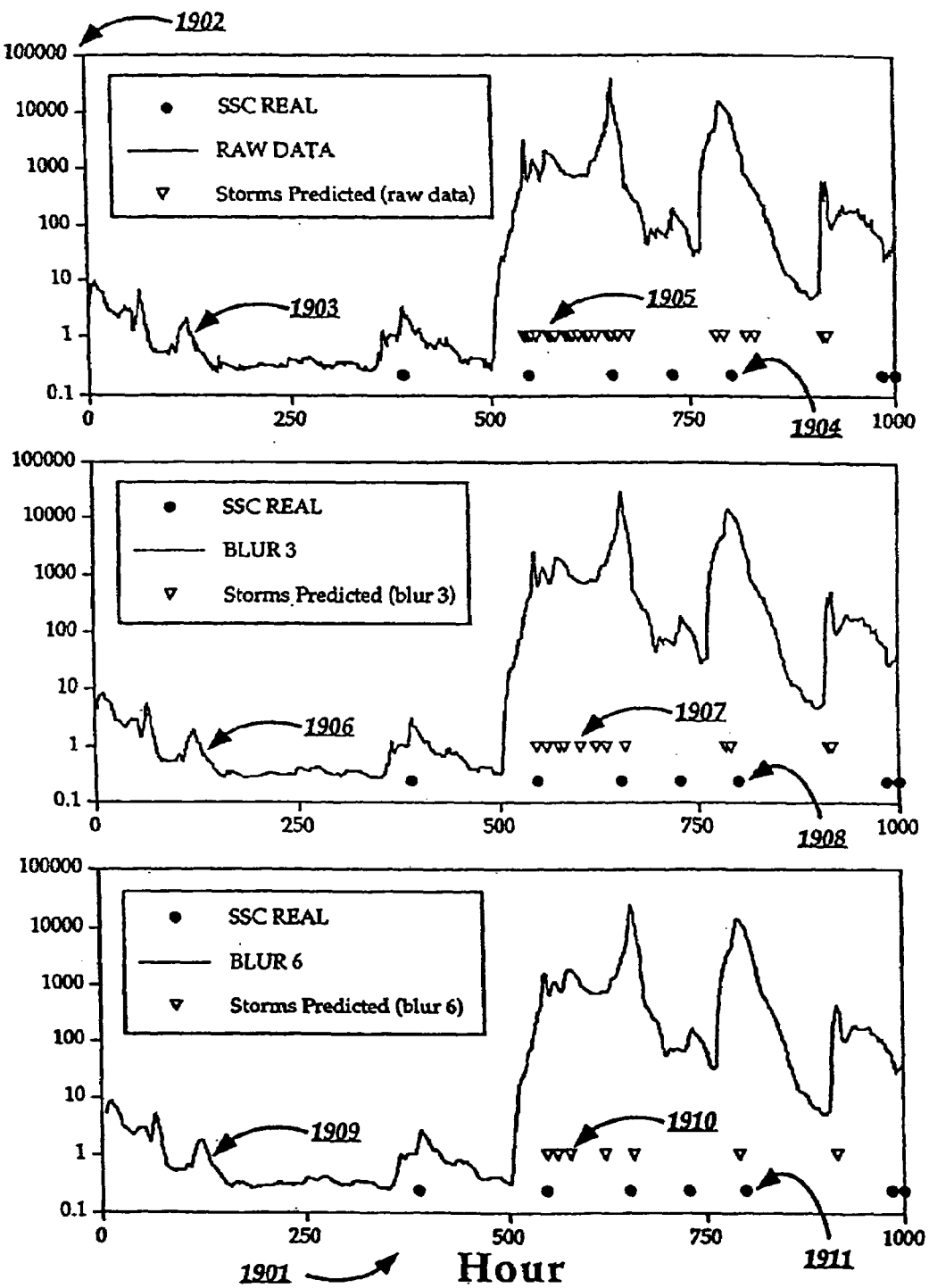
FIG. 14 illustrates forecast results of an expert system in accordance with the present invention using different blur amounts.

Results of the GetCurrentValue routine for different BlurAmounts are depicted in FIG. 14, using energetic particle data as the data of interest. The x-axes 1901 in the three graphs presented in this figure all represent hours and the y-axes represent the log of energetic particle measurements of particles having energy greater than 1 Mev (number/(cm-square) sec sr). The data values were taken, for illustrative purposes, from a period beginning in March, 1991.

In the top graph, the raw (unprocessed and therefore not averaged) values of energetic particles are graphed 1903. The small circles 1904 indicate times when sudden commencements actually occurred (i.e. times when there were extreme space storms). The predictions from the invention are indicated by small upside down triangles 1905. These predictions were obtained using a threshold of approximately 200. Although some of these predictions are rather accurate, there are clearly many false-alarms (i.e. the algorithm is too liberal and predicts storms when none were actually occurring).

In the middle graph of FIG. 14 the data are again plotted 1906, but this time the BLURAMOUNT is set to three hours. Thus, each point on curve 1906 is really the average of three successive hours found on curve 1903. In this middle graph the predictions 1907 and actual storms 1908 are again indicated. There are fewer false alarms in this case than in graph 1903.

Finally, in the bottom graph, the energetic particle data values are plotted 1909 with a BLURAMOUNT of 6 hours. Again, the predicted storms 1910 and actual storms 1911 are indicated. Compared to both the top and middle graphs it is clear that using this larger amount of blur has decreased the number of false alarms.

In contrast to the present invention, one skilled in the art will appreciate from FIG. 14 that prior techniques that look only at fluxes over a certain threshold might issue warnings that a storm is coming over a long period of time representing several distinct storms. For example, for the data represented in FIG. 14, if the threshold was 10, a system based only on a threshold would issue a warning continuously from approximate hours 500 to 900, even though that period encompassed four distinct storms.

An expert system in accordance with the present invention is not limited to various forms of peak detection. Similarly, expert systems could be based on linear or non-linear time-series forecasting techniques. For example, in an alternate embodiment, the expert system (1) examines the current or recent space weather conditions, (2) calculates the variation (e.g. standard deviation) of SEP counts over a recent time interval; (3) calculates (a) the number of hours since the last storm and (b) the number of hours since the storm before the last storm; and determines the time until the next storm based on the results of (1), (2), and (3). This prediction is made by comparing the current SEP variation and time-between-storms to historically-derived distributions of these values in space weather conditions similar to the current conditions. For example, a distribution might be created which consists of the time-between-events on the x-axis and the number of times that this temporal delay was observed on the y-axis. Several variants of this basic distribution can be created: one that is based on historical data following solar events by less than 200 hours, another based on historical data following solar events by 200–400 hours, etc. Once the distributions have been created, the choice of which distribution to use for the current data is made (based on the results of (1) above) by examining the current or recent space weather conditions. Once this selection is made, it is possible to derive the most-likely time-to-event from this distribution by using standard (and well-known) statistical techniques. The degree of confidence in this forecast could be based on historically similar observations and forecasts as the percent of forecasts that were issued and then validated.

Other expert systems combining several rules have been used in alternate embodiments of the present invention. For example, rules that analyze the time varying profiles of SEPs have been found to improve predictions; in particular, rules analyzing the rise times of fluxes in different energy channels, changes in the 3He/4He ratio, and comparisons of rise times of proton fluxes, electron fluxes, alpha fluxes and other ion species in different energy channels. As in the case of the previous embodiment, the final prediction may be generated in a number of ways. It could be either an average of each of the expert predictions or a "worst case" prediction, etc. As in the case of the previous embodiment, the final prediction may be generated in a number of ways (e.g. via a "worst case" technique, via a weighted sum of subsystem predictions, via a weighting based on recent predictions, etc).

Also, as in the template-based embodiment, the expert system embodiment allows for a quantification of the confidence of a prediction. For example, in a preferred embodiment that utilizes rules regarding peak-detection, the confidence level of a prediction can be obtained by several means such as (1) via a function that compares the current peak size to other peaks in the recent past, (2) via a function that examines the correlation between the current peak and recent solar activity, (3) via a function that quantifies the Fourier power of the current peak, etc. Once the confidence level of a prediction has been quantified, it can be displayed as part of the output of the prediction system. Or, if as may be the case, the expert system is a part of a larger (hybrid) forecasting system (e.g. if several sets of rules are operating in parallel or if the expert system is operating in parallel with a template based system, etc), then the weight of the expert system prediction in the final (overall) prediction could be a function of the calculated prediction-confidence.

NEURAL NETWORK BASED EMBODIMENT

Figure 15:
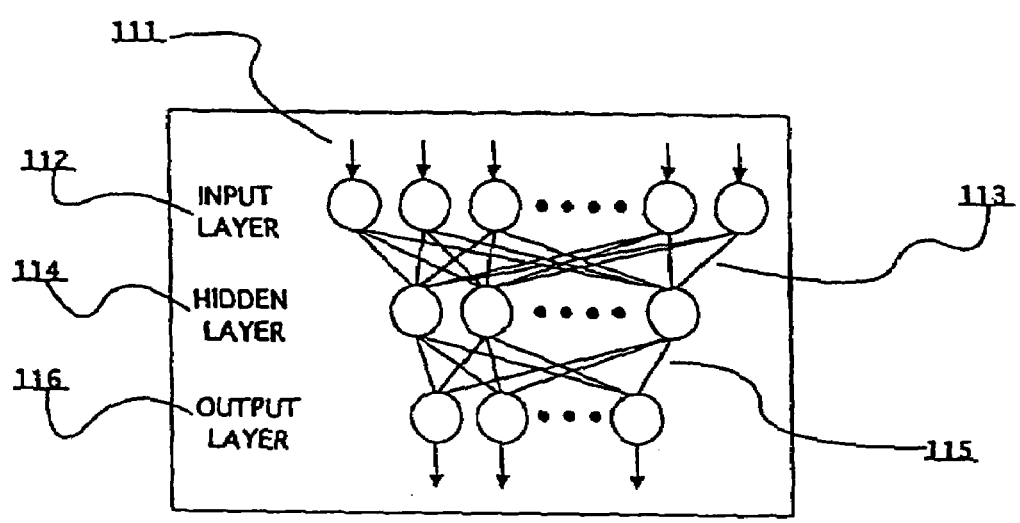
FIG. 15 illustrates a three-layer neural network.

FIG. 15 shows an example of a simple three-layer neural network 111 comprising an input layer 112, a hidden layer 114, and an output layer 116. Neural network input data are of a vector form (i.e. each data point is actually an ordered series of numbers). These data are fed into the network 111 by setting the values of the nodes in the input layer 112. Activity then flows through the network via the connections 113 that link each node in the input layer 112 to each node in the hidden layer 114. Each of these connections has a weight associated with it such that the amount of activation flowing through any particular connection is actually the product of that connection's weight and the value of the input node. The amount of activation of any node in the hidden layer will either be the sum of the weighted connections feeding into that node or, for example, the sum of the weighted connections fed through a threshold function (such as a sigmoidal weighting function). Information flow continues in a similar fashion from the hidden layer 114 to the output layer 116 through a set of weighted connections 115.

A neural network (like the one shown in FIG. 15) is a sophisticated way of mapping one set of vectors (the input vectors) into another set of vectors (the output vectors). However, for this mapping to be useful, the neural network must first be trained. This training consists of making small changes in the weights and/or thresholds of the neural network. After the training is complete, the neural network should perform the desired mapping. Although many different techniques can be used to train a neural network, most of them rely on the same logic: (i) a set of input-output pairs are obtained (this is the "training set"), (ii) each input is fed into the neural network and the resulting output is compared with the desired output, and (iii) based on the results of this comparison changes in the weights and/or thresholds are made to reduce the error between the obtained and the desired output. This input-output training continues until the error rate has been reduced to acceptable levels. Thus, the first step in using a neural network involves the creation of the input-output pairs that are used to train the network. The neural network training could be based on back propagation or on other training techniques (for example, on Hebbian or self-organizing methodologies). Implementing a neural network is known and will not be described in detail herein.

The ability of a neural network to accurately forecast space weather depends in part on defining the correct data to use as input and output vectors in the training set. The present invention, unlike past neural networks for predicting or classifying space weather, is trained, in one embodiment, using three or more SEP data points and the phase of the solar cycle as input parameters. In other embodiments, the neural network is, for example, additionally trained using combinations of data—for example, the neural network might be trained with SEP data from different energy bands, SEP data in combination with solar data, and/or SEP and solar data that is temporally separated. In one embodiment, for example, the neural net is trained with x-ray data followed by SEP data. Preferably, the neural network is also trained with data that are not associated with space weather events, resulting in better predictions of quiet conditions.

In each case, the training set is derived in a manner similar to that described above in connection with the template embodiment; for each solar event or space weather event of interest, associated data are obtained from historical data stores based on the time of solar event or of the space weather event. The training input vectors are therefore the data obtained from the historical data stores and the output vectors are chosen to uniquely represent the event or quiet condition associated with the data.

After the neural network is trained, current data of the form used in training are input to the neural network, which in turn will output a vector identifying the space weather forecast.

The output vector will, in most cases, be slightly different from the idealized output vectors that were used to code the training data. For example, if the current data were from a severe west event (an event that might have been coded as <1,0,0> during training), the output vector might be <0.95, 0.002, 0.1>. Measures of prediction confidence can be obtained by looking at, for example, the Euclidian distance between the current output vector and the idealized (training-coded) output vector. Such a measure of prediction confidence could then either be output along with the prediction, or could be used to weigh this prediction in a larger (hybrid) space weather forecasting system.

In one neural network embodiment ten values of integrated proton flux greater than 1 Mev, each spaced by five hours, were used as input into the neural network. Seven hidden nodes were used and the network was trained to predict whether a geomagnetic storm would occur, generating a yes or no as its output. After training the neural networks with both events and non-events, the neural network accurately generated predictions of the training data. When new critical periods of historical data were input to the neural network it generated the historically correct prediction 94% of the time. As discussed previously, the confidence level in new forecasts can be determined by the percentage of cases in which similar observations and forecasts were made and validated.

In another neural network embodiment, separate neural networks were created for West, Central and East originating solar events. A storm is forecast if any of the neural networks predict one. When new critical periods of historical data were input to such a system of neural networks, the system generated even better predictions than the previous embodiment.

Similar results for a yes/no forecast of the occurrence of a storm can also be obtained when the West, Center and East templates are built into the neural network coefficients of a single neural network.

In other neural network embodiments for certain types of prediction (e.g., time to storm, severity of storm), it has been found that training separate neural networks on subsets of the data (for example, as described above, on West, Central and East events), as opposed to training a single neural network with all types of data, increases the accuracy of the predictions. Networks trained on other types of data (e.g., x-ray, wave) also can increase the accuracy of these types of predictions. Additionally, it has been found that forecasting accuracy can be improved by creating and using multiple neural networks each of which is trained on data derived from historical periods meeting certain criteria. For example, one neural network might be trained on data that comes from periods where solar activity was particularly high (e.g. during solar max), another might be trained on data coming from relatively calm periods. Or, one neural network might be trained on data taken from periods where Bz (the southward component of the IMF) was negative for long periods of time. Or, one neural network might be trained on data taken from periods having a high number of coronal holes, etc. Once these networks are trained, predictions will be made by inputting the real-time data to the neural network that best matches the current conditions. This customized and dynamic aspect of the space weather forecasting system increases overall accuracy and makes the system better at handling cyclical and seasonal variations in space weather.

After a prediction has been generated and some time has passed, it is possible to evaluate the accuracy of the prediction and dynamically modify the forecasting system. This can happen in several ways. In one way, as more data are obtained which fit a criteria used to generate the input-vectors, the neural network can be re-trained using this new input vector and the appropriate output vector (i.e. as, over time, "new data" become "historical data", the neural networks are re-trained using both the previously historical data as well as the "newly-historical" data).

Hybrid Space Weather Forecasting Systems

As discussed above in connection with the template embodiment, hybrid space weather forecasting systems do a better job of prediction than simple (singular) forecasting systems. One such hybrid system consists of several sets of templates (each specialized for particular space weather starting conditions, such as, but not limited to, the phase of the solar cycle) each one devoted to predicting the time-to-arrival of a space weather event. The system further consists of several neural networks and several expert systems also predicting the time-to-arrival of a space weather event. All these subsystems will operate in parallel on the incoming data. Each subsystem will generate not only a prediction (e.g. "there will be an event in the next 20 hours", etc), but also a metric indicating the confidence of the prediction (e.g. "there is an 82% chance that there will be an event in the next 20 hours"). The overall space weather forecasting system can then yield a prediction based on, for example:

(1) an average of the subsystems predictions weighted by each systems confidence, (2) a "worst case" prediction based on taking, for example, the most severe prediction that occurs with a confidence level over some set threshold (e.g. over 80% confidence level), (3) a prediction that takes into consideration not only the current predictions and their confidence ratings, but also the predictions and confidence ratings from recent time intervals (e.g. the past 4 hours), (4) the outputs of subsystems producing different forecasts (e.g., several subsystems may forecast severity and others onset time), enabling an automatic processor and/or human operator to issue a final prediction.

As more data become available, the hybrid system updates its predictions. Notice that, as mentioned in (3), the current predictions could also be a function of previous predictions. Thus, at each moment in time, the predictions that are generated are not simply a result of a process acting on simple data, but instead the overall prediction could be a function of both new ("raw" or "processed") data as well as previously processed data. This non-linear (feedback) aspect of the space weather forecasting system in accordance with the present invention allows the current predictions to be informed by previous data and thus enables the system to more completely process the information present in the data and identify highly-complex patterns in the data.

In one preferred embodiment, when a prediction is made with a high-degree of confidence, the prediction might allow the forecasting system to extrapolate or predict future SEP or other data. In such situations, it is possible for the forecasting system to take as input (and process) either the raw data or the raw data minus the extrapolated or predicted future data. By looking at the raw data minus the predicted data, the system is better able to identify patterns indicative of a space weather event that might otherwise be hidden in the current event. For example, if a large space storm of a particular type were predicted (with a high degree of confidence), then the SEP and other data for the next several days might be contaminated by this storm. In this situation, for the next several days the predicted data could be subtracted out from the current data and, by examining the residual data, the space weather forecasting system might identify additional space weather events that might otherwise have gone unnoticed.

The hybrid systems described herein are examples of what the inventors term "multimodal intelligent systems." Multimodal intelligent systems include, but are not limited to, systems that combine two or more types of subsystems each carrying out data processing. Such processing might include neural nets, fuzzy logic, expert systems, pattern recognition systems, standard mathematical methods of digital signal processing, classical statistics, etc. For example, three neural networks that are respectively good at detecting east, center, and west events might provide a neural network discrimination or pattern recognition step before making a final prediction. The final prediction could be based on additional subsystem processing (e.g. via templates or expert systems) that occurs either in parallel (i.e. using as data the same inputs as the neural nets) or in serial (i.e. after the data have already been processed by the neural networks). A "multimodal intelligent system" is thus an artificial intelligence methodology, such as neural networks, expert systems, etc., in which there are multiple subsystems analyzing the data (either in parallel or in serial).

Cascading Hybrid Systems

In most general terms, a cascading hybrid system is a collection of multiple prediction/identification methods (PIMs) in which the outputs of the PIMs are used as inputs into the same or other PIMs. A PIM is one of the previously described unitary prediction systems (e.g. a template-based system, a neural network system, or a strict or fuzzy expert system), hybrid systems (e.g. a system that contains several templates, neural networks and/or expert systems) or some other multimodal intelligent system that combines two or more types of subsystems each carrying out data processing. Once a cascading hybrid system is running, it will continually generate predictions, forecasts, and identifications. These outputs will then be fed back into the cascading system—thus, new predictions, forecasts, and identifications will be made based on the feedback-results of PIMs that are all potentially operating in parallel. For example, at time 1, a PIM might identify a solar flare; next (at time 2) a second PIM might gauge the size of the solar flare; at time 3, a third PIM might gauge the impact of flares of this size; at time 4, a fourth PIM might identify a CME originating near the solar flare, etc.

Figure 16:
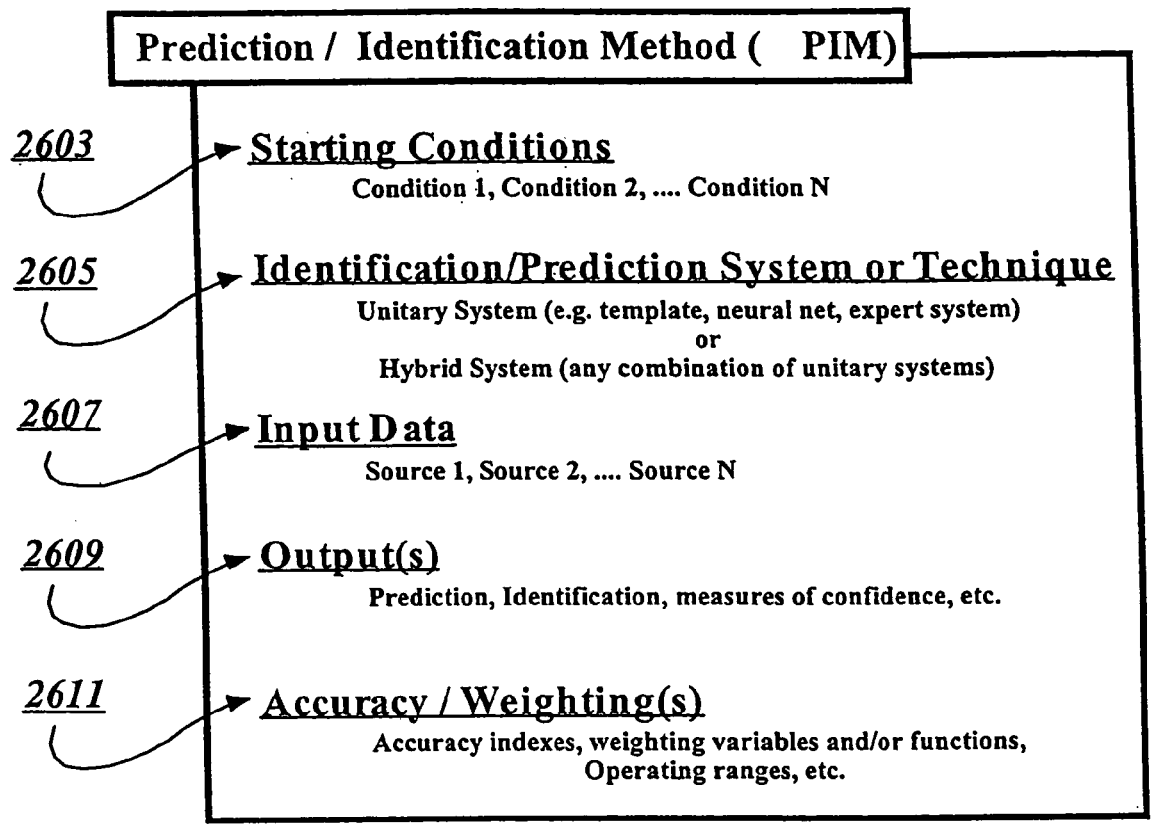
FIG. 16 illustrates a generic prediction/identification module (PIM).

FIG. 16 illustrates a generic prediction/identification module (PIM). In a preferred embodiment of the present invention, each PIM contains the following attributes:

(a) A list of "starting conditions" 2603, describing situations in which the PIM is intended to function. Examples of starting conditions include: solar max, solar min, during periods of extreme sunspot activity, when solar wind speed is greater than X, when a CME has occurred or been predicted to occur, etc. The starting conditions may be binary in nature (e.g. "when electron flux>20 particles/cm 2sec", "when a solar flare has occurred") or "fuzzy" (e.g. "when Dst is less than approximately −12," or "when there is a suggestion of a proton event initiation," or "when radiation levels are approaching dangerous levels," etc.).

(b) A unitary or hybrid identification or prediction system/ technique 2605, that makes an identification or generates a prediction. The system/technique may be one of the template-based, expert system-based, neural network-based or hybrid systems described above or, more generally, any system, technique, or formula for predicting space weather or for generating identifications, predictions, forecasts, or values in domains that are either pertinent to space weather prediction or to, for example, predicting space-weather-related effects on biological, physical, chemical, electrical, material or other objects/systems (e.g. geophysics, electrical engineering, computer science, materials science, biology, chemistry, crystallography, etc). Examples of suitable system/techniques include, but are not limited to:

(1) an expert system that identifies or predicts the initiation of a solar flare from optical data;

(2) an expert system that identifies or predicts the formation of new radiation belts;

(3) a neural network that identifies or predicts the initiation of a CME;

(4) a template system that predicts time profiles of SEP intensities for various energy ranges and species;

(5) hybrid systems that predict time profiles of SEP intensities for various energy ranges and species;

(6) a template system that identifies the position of solar origin of the events based on SEP time profiles;

(7) a hybrid system that takes as input solar data (e.g., x-ray, optical, gamma ray, microwave, etc) and SEP data (e.g., electrons, ions, species, etc) and identifies the solar origin (e.g. time, position, etc.) of a solar event (e.g. a CME, a flare, etc);

(8) a neural network that uses as inputs SEP profiles and predicts Dst;

(9) a template system that identifies an x-ray burst during a period of noisy data;

(10) a hybrid system (i.e., a multimodal intelligent system) that uses neural network and pattern recognition subsystems to identify an x-ray burst during a period of noisy data;

(11) a template system using time profiles of SEP flux or counts at a number of energies (eg, <1 MeV/nuc, >1 MeV/nuc, >10 MeV/nuc, >100 MeV/nuc, etc.) or in various energy bands/ranges (e.g., 0.5–1 MeV/nuc, 1–2 MeV/nuc, etc.) that predicts the arrival time of a shock at the location of a spacecraft or at Earth;

(12) a hybrid system that takes as inputs the time profiles of SEP data (e.g., at various energies or in energy bands, etc.) and uses pattern recognition and other multimodal intelligent systems to predict the arrival time of a shock at a specified location (e.g., interplanetary spacecraft, earth, etc.);

(13) a hybrid system (built around one or more expert systems, each of which is based on a version of a transport equation, e.g., as in Lee and Ryan, 1986) that uses the results of its subsystems to yield predictions of particle accelerations and/or shock arrival times at particular spatial locations;

(14) an expert system that estimates the shock compression ratio from the shock arrival time;

(15) an expert system that predicts the conditions upstream of the shock;

(16) an expert system that predicts the post-shock solar wind speed and/or density;

(17) an expert system that uses as inputs SEP data and then predicts the level of turbulence and fluctuations in the solar wind and IMF behind a shock;

(18) a template system that takes as input SEP data and predicts Kp;

(19) a template system using SEP time profiles that predicts sudden commencements (SSCs);

(20) an expert system that uses as input data SEP values and predicts CME arrival time;

(21) an expert system that estimates the minimum time between shock arrival and CME arrival;

(22) an expert system that predicts the equatorial edge of the visible auroral oval when Bz is southward (<0);

(23) an expert system that predicts polar cap potential;

(24) an expert system that predicts the tailward displacement of the equatorward border of the visible aurora;

(25) a hybrid (multimodal) system that predicts ionospheric disturbances;

(26) an expert system that predicts a radiation hazard (and/or radiation levels) at the International Space Station;

(27) a hybrid system that predicts spacecraft anomalies;

(28) an expert system that predicts spacecraft charging;

(29) a hybrid system that predicts communications blackouts at various frequencies;

(30) an expert system that predicts possible disruptions (and/or the amount of disruption) of communication and/or navigational systems;

(31) an expert system that predicts dangerous radiation levels for airplane flight crews and passengers on high-flying polar flights;

(32) an expert system that predicts the latitudes and geographic extent of power surges and dangerous ground induced currents at power stations;

(33) a hybrid system that predicts the times and locations of possible GPS inaccuracies due to ionospheric disturbances;

(34) an expert system that predicts when air traffic controllers should require airplane pilots to rely on visual sightings rather than GPS;

(35) an expert system that predicts (down to low latitudes) the times of visible aurora;

(36) an expert system that uses a combination of equations and rules to take multiple K values as inputs and return an estimate of current (or future) values of Kp;

(37) an expert system that takes as input information about a spacecraft or airplane flight (e.g. planned route, departure time, current time, etc.) and returns the current position of the asset;

(38) an expert system that generates "pseudo-values" of variables of interest (e.g. higher temporal resolution Dst data, electron flux values during periods of data gaps, etc.).

(c) A type (and form) of input data 2607. The particular type and form of data are dependent on the PIMs starting conditions and the type/architecture of the system. For example, in one preferred embodiment the input data are averaged measures of SEP data taken from one particular energy band (e.g. 10–100 MeV)—each hour for at least three hours (i.e., at least three values are used). These data might then be used as input to the PIMs neural network, expert, template, or hybrid system. In another preferred embodiment the input data are averaged measures of SEP data from several ion species (e.g. protons, 3He, 4He, C, O, Fe, etc.) from one particular energy band (e.g. 0.2–1.0 MeV/nuc, 5.0–10.0 MeV/nuc).

(d) A type (and form) of output 2609. The output might be an identification (e.g., "based on the input data, this PIM's technique has identified a rise in radiation levels," or "based on the input data, this PIM's technique has recognized an electron burst" or "based on the input data, this PIM's technique has identified the initiation of a CME."). Alternatively, the output might be a forecast of a space weather event (e.g., "based on the input data and the PIM-technique, ground induced currents (GICs) are likely to occur in high latitudes", or "based on the input and the PIM-technique, a severe shock is predicted to occur at the ACE spacecraft and a very energetic proton flux is predicted at the International Space Station"). Or, the output might be a prediction of the value of a variable or parameter that may be of interest in forecasting space weather (e.g., the solar wind speed). Additionally, the type and form of output is not limited to a binary decision (e.g. a prediction could be accompanied by a probability, or the identification could be returned as an analog numeric value). Nor is the type and form of PIM output limited to a single value or decision (e.g. the forecast could be multi-part, such as "based on the data, a shock is likely to occur: the shock will be severe and will arrive at position X within the next 25–32 hours"). Additionally, as will be seen below, once a cascading hybrid system is functioning, any prediction, identification, forecast, etc may be modified and refined by the actions of other PIMs in the system.

(e) A set of numeric or other measures/descriptions of the PIM's accuracy, weighting, resultant actions, and/or dependencies 2611. The "accuracy" value provides a measure of the average accuracy of the output of the PIM (assessed, e.g., through the numerical means detailed below). The "weighting" value indicates how much each PIM contributes to a combined output in a cascading hybrid embodiment in which multiple PIMs contribute to generating an overall identification, forecast or prediction.

"Resultant" actions are actions that may be performed depending on the output of the PIM. These actions can take several forms. One type of resultant action is associated with modifying either the cascading system as a whole or parts of the cascading system (e.g. certain sets of PIMs, certain weighting factors, etc.). Examples of these types of actions include: the modification of the weightings of certain PIMs, the activation/deactivation of certain subsets of PIMs, and the initiation of verification sequences (e.g. of data integrity, of system(s) integrity, of PIM performance, etc.).

Another type of resultant action involves notifications (e.g. of satellite operators, astronauts, etc.) of impending space weather events. The FONE architecture described below is one preferred way of handling notifications. It is also possible to have notifications handled by the cascading hybrid system itself by, e.g., sending an email, making a telephone call, or setting off an alarm or chain of notifications if a particular output condition is met. For example, if a large shock is predicted to occur at the location of a particular asset—such as an interplanetary spacecraft—then the asset owner may be notified of this potential situation. Similarly, if a PIM's prediction technique or algorithm has predicted possible transmission disruptions, a communication center may be alerted that it should employ real-time monitoring of transmission integrity.

In general, these additional numeric or other measures are used to either increase the precision of the overall system, or modify the ways in which multiple PIMs work together, or influence the feedback (to other PIMs) or feedout (warnings, etc.) of the cascading hybrid system.

A cascading hybrid system in accordance with the present invention is not dependent on the specific starting conditions, systems/techniques, type and form of input data, type and form of output data or accuracy or weighting techniques used in the PIMs.

By weighting, judging, and/or pruning sets of PIMs (or sets of PIMs), the precision, accuracy, and usability of the space weather system can be improved. For example, a set of one or more PIMs performance may be assessed based on historical, model-generated, or other types of archived or real-time data. For example, the performance of a set of one or more PIMs may be assessed based on comparing the PIMs' outputs to historical, model-generated, or other types of archived or real-time data. This assessment could be performed through manual means (e.g., by visually inspecting the predictive performance and then assigning a weighting, confidence, or other score) or automatic means, as illustrated in FIG. 17.

Figure 17:
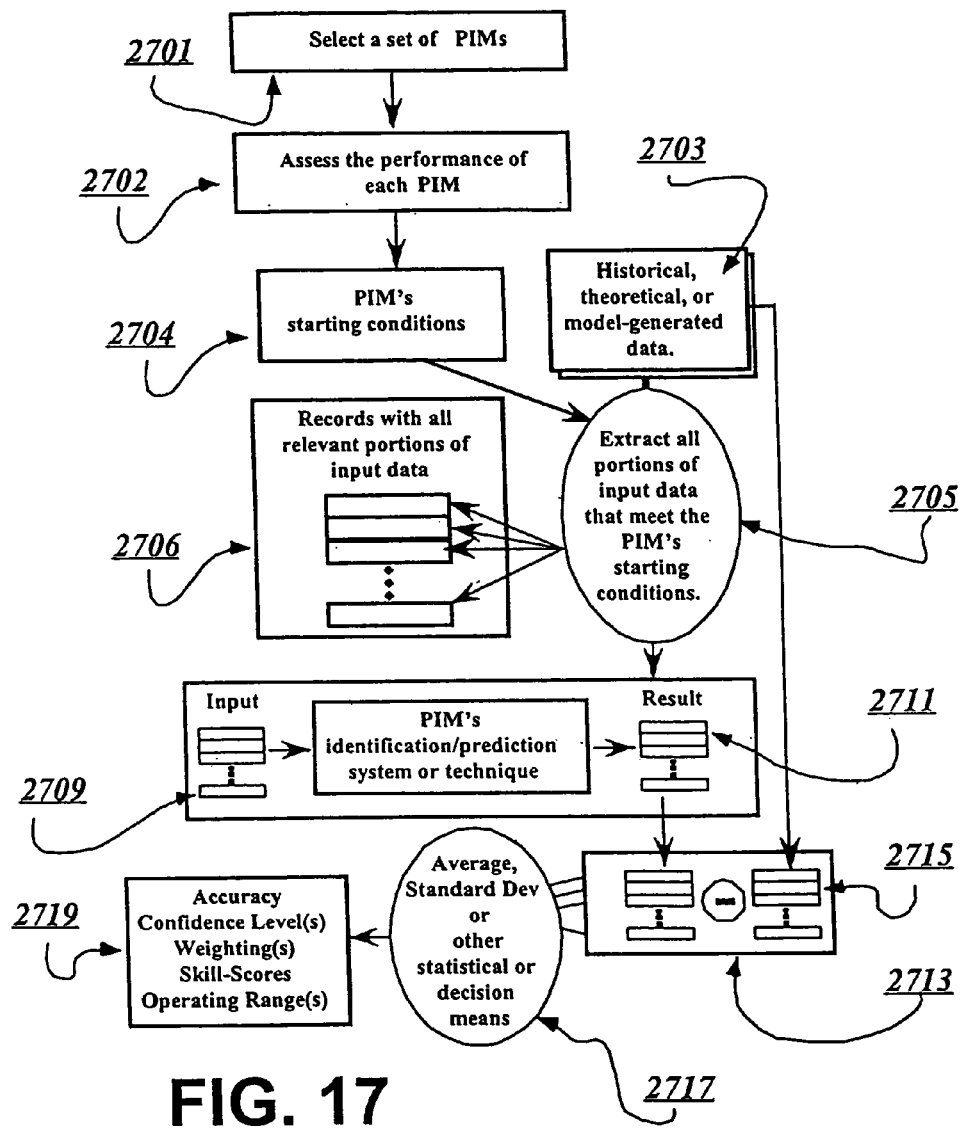
FIG. 17 is a flowchart that illustrates assessing a set of PIMs.

FIG. 17 illustrates one computational method for assessing PIM performance. Initially, a set of one or more PIMs is selected (step 2701). These PIMs can be selected in numerous ways. In one embodiment of the present invention, the PIMs are chosen because they all attempt to predict, forecast or identify the same (or similar) output data. For example, a set of PIMs might all attempt to identify the initiation of a CME, or all attempt to predict a shock arrival time, or all make estimates of the solar wind density. It should be noted that although these PIMs might have the same desired output, they may have for example different input data and different prediction/identification techniques. Alternatively, the PIMs in the set may be chosen based on the particular identification/prediction system or technique 2605 that they contain. For example, a set of PIMs may all use a particular expert system. Again, it should be emphasized that these multiple PIMs might differ in many other ways (e.g. each of these PIMs might use a different type or form of input data). This set of PIMs might be chosen, for example, to evaluate the performance of a computational technique or algorithm (e.g. to evaluate and/or quantify its robustness across energy bands, across times, across starting conditions, etc.).

After the set of PIMs has been identified, their performance is assessed, starting in step 2702, based on historical, theoretical, or model-generated data 2703. This assessment takes place through means similar to those discussed in previous embodiments. In step 2702, a PIM in the set of PIMs is selected for assessment. In step 2704, the starting conditions 2603 for the selected PIM are retrieved. In step 2705, data from periods meeting the PIM's starting conditions are extracted from historical, theoretical, or model-generated data store 2703 and placed in relevant data store 2706. After all the relevant data are identified, they are fed, in step 2709, into the identification/prediction system or technique (2605) for the PIM and the results of the PIM's identification/prediction system or technique are stored in results store 2711. In step 2713, the results are compared to the "true" (historically, theoretically, or model-generated) result data 2715. In step 2717, this comparison will yield a set of error rates which can be combined, averaged, or analyzed in many ways, including but not limited to statistical averaging, statistical means of analyzing dispersion, and other methods of analyzing performance, etc. By following this algorithm with all available data and for all PIMs of interest, average or other measures of accuracy are obtained in step 2719 for each PIM. Additionally, confidence-levels may also be obtained for each PIM. In contrast to "average" measures of error, confidence-levels reflect the range of errors obtained by a PIM (i.e. they give an estimate of how far off the prediction might be, e.g. "plus or minus two hours"). Such confidence levels can be obtained, for example, by calculating the standard deviation of the errors or by using other statistical measures of population dispersion. Still additionally, using an almost identical logic to that described above, other measures of interest can be obtained, such as, but not limited to: "operating ranges" which reflect the range of values over which a PIM gives acceptable results, "peak sensitivities" which reflect the numeric or other values for which a PIM yields near-optimal results, etc. These values can then be inserted into the set of numerical values associated with each PIM 2611. Alternatively, the accuracy or other values associated with each PIM of interest can first be normalized (e.g. using the well-known technique of z-scoring) before being inserted into the values associated with each PIM 2611.

Alternatively, if PIMs that yield particularly poor results are identified, they can be "pruned" (i.e., eliminated) from the set of PIMs. Also, the "operating ranges" for a PIM (which can be calculated through the technique illustrated in FIG. 17), may be added to the "starting conditions" associated with the PIM.

The described technique of weighting, judging, or pruning PIMs and sets of PIMs should be continued until the system (i.e. all PIMs and sets of PIMs) has been thoroughly examined. In one preferred embodiment, a system is only considered "thoroughly examined" after:

all PIMs have been assessed, weighted, etc. based on all the available historical data, all PIMs have been assessed, weighted, etc. based on any available theoretical or modeled data, all sets of one or more PIMs have been assessed, weighted, etc. based on all the available historical data, all sets of one or more PIMs have been assessed, weighted, etc. based on any available theoretical or modeled data.

Additionally, as more data become available (e.g. across time or through the development of new and/or better models or theories), the weighting, judging, or pruning of PIMs should be carried out on a regular (and preferably automated) basis.

The assessing/pruning method detailed above can also be used to identify (and/or create) new systems/methods of identification or prediction. For example, a hypothetical PIM could be created around, e.g., an expert system that takes as input the current speed of the solar wind and tries to identify whether or not a CME has occurred within the past 48 hours. This expert system could use just one simple rule like:

IF (solar wind speed)>800 km/sec THEN "yes a CME has occurred"

This example is entirely hypothetical and thus a PIM built around this rule would have a very low accuracy. However, assume that this rule was created based on a deep knowledge of physics. Even if this were the case, it is highly unlikely that the truly critical value is precisely 800 km/sec. Recognizing this, a cascading hybrid system could be created having multiple PIMs each having a different "critical value." For instance, eight hundred PIMs could be created, the first with a critical value of 400, the next with a critical value of 401, the next 402, etc. Then these eight hundred PIMs could be chosen as the PIMs of interest 2701 and the technique shown in FIG. 17 could be used to identify the best-performing PIM and, therefore, the empirically-best critical value. Following this same logic, "empirically-best" neural networks can be identified by creating hundreds of PIMs, each built around a slightly different neural network (perhaps each network having a different number of hidden-layers and/or a slightly different learning rule, etc.). A similar technique (creating multiple variations, assessing them, and selecting the best) can be used to select among, for example, different sets of templates, different sets of "weighting functions", etc. In addition, the "assessment" need not be done on historical data—instead, theoretical, simulated, or modeled data could be used. Finally, other well-known statistical or numeric techniques for identifying the optimal PIM (or optimal sets of PIMs) could also be used. Examples of such techniques include: simple extrapolations of values, the Newton-Raphson iterative approach, a lattice-based iterative technique, or other such algorithms.

Figure 18:
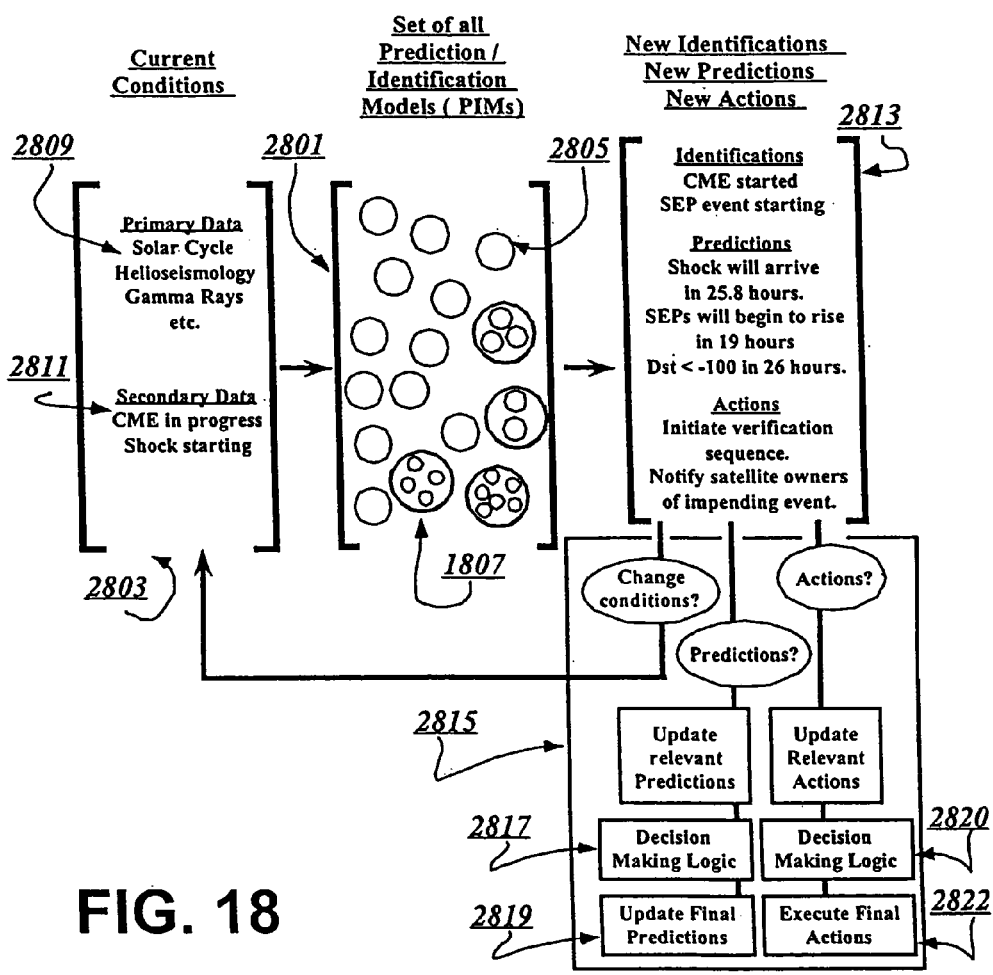
FIG. 18 illustrates a cascading hybrid system.

Once an acceptable set of PIMs has been created, it can be used in a cascading hybrid system, as illustrated in FIG. 18. A cascading hybrid system consists of a set of PIMs 2801 that "act on" the available data 2803, yielding identifications, predictions, and, possibly, associated actions 2813. The set of PIMs might include one or more singular systems 2805 (e.g. template, expert, or neural network) as well as one or more hybrid systems 2807. The available data 2803 might include primary data 2809 and/or secondary data 2811. Primary data are direct, indirect, or derived measures of variables such as those described above in connection with other embodiments (e.g., particle measures, optical measures, x-ray measures, ratios, etc.). Secondary data are those that arise in other ways, such as, but not limited to:

As a result of predictions or assumptions

As a result of conditions, variables, etc. that are known to scientists, mathematicians, etc. (e.g. solar max, "high activity" observed but not quantified, etc.).

As a result of one or more PIMs generating identifications, predictions, etc.

The last type of secondary data above illustrates the cascading nature of a cascading hybrid system. In general, the result of any PIM 2813 or set of PIMs can become a new element of the "current conditions." After a PIM has produced a result 2813, the type of the result will determine how the cascading system behaves, as shown in box 2815. For example, if a PIM yields an action, that action will be executed. The action may be, for example, to update a display (although it is also possible, and perhaps preferable, to handle such actions through the use of the FONE architecture described below). Alternatively, the action may be to notify a user or system through electronic or other means (again, this can also be accomplished through the FONE system described below). Still alternatively, the action may be to modify the cascading hybrid system or the PIMs in some way (e.g. by changing the relative weighting of PIMs, by modifying the current conditions, by activating/deactivating particular PIMs, etc.). Additionally, in situations where an action depends on multiple PIMs (i.e. several PIMs dictate the same or similar actions), a decision rule 2820 (e.g. worst case scenario wins, average action should occur, etc.) will factor the multiple actions before the final actions 2822 are executed.

If a PIM yields a prediction, the current or relevant predictions might have to be updated. As was the case with the "final actions", in situations where a final prediction depends on the outputs of multiple PIMs, a decision rule 2817 will process the multiple predictions before the final predictions 2819 are updated. In one embodiment, the form of the predictions is a numerical value indicating, for example, the strength of the event or the predicted onset time. Alternatively, the predictions may be accompanied by a measure of the confidence of the prediction (such a measure can be obtained, for example, by returning the standard deviation of the relevant predictions). Other methods of handling actions and predictions are described below.

Finally, if a PIM generates a result (e.g. an identification or a prediction) that can alter or augment the current conditions, then the conditions must be updated accordingly.

It should be emphasized that a system in accordance with the present invention may include dozens or even thousands of PIMs. However, a cascading hybrid system will preferably have a "core" set of PIMs that have been extensively and rigorously tested on a great deal of data: historical, theoretically modeled, simulated, real-time, etc. The validation and verification of the predictions of these PIMs is an important aspect of this system. These "core" PIMs should be found (through empirical or theoretical means) to work very well in their given area(s) and should have survived all prunings. Their results may well be given more weight and are most likely associated with higher confidence levels, etc.

In addition to the "core" PIMs, in many situations, there will be certain PIMs that are more relevant or central to the actual space weather forecast of interest. Which PIMs these are cannot, in general, be determined in advance for all situations. For instance, at one time the user of a cascading hybrid system might be interested in using current and/or recent values of Dst to predict future values of Dst. In this case, the PIMs devoted to Dst (and perhaps those related to variables associated with Dst) may be considered the "relevant" or "central" PIMs. Another user (or the same user) at the same time might be trying to use older (or even historical) values of Dst to predict future Dst values (e.g. two weeks in advance) by employing PIMs with other multimodal intelligent systems (e.g. systems that model the data using chaotic or fractal techniques, etc.). At the same time still another user (or one of the same users) also may be using the same type of multimodal intelligent systems (e.g. systems that model the data using chaotic or fractal techniques, etc.) with historical SEP values to predict future SEP values/events (e.g. two weeks in advance). Meanwhile, yet another user (or one of the same users) at the same time (or at a different time) might be trying to predict where the aurora ("northern lights") might be visible on a particular occasion. In this circumstance, the relevant PIMs might include, for example, some PIMs devoted to predicting particle data, other PIMs devoted to processing the Earth's magnetic field, and still other PIMs aimed at local condensation forecasts (taken from, for example, real-time public domain internet weather sites). However, still another user (or one of the same users) at the same time (or at a different time) might be interested in predicting the impact of a shock during solar minimum at, for example, a spacecraft at or near a planet (e.g. Mercury, Mars, or Jupiter), a heliocentric spacecraft (e.g. STEREO), or at the position of an "interstellar" probe on its way out of the heliosphere. In this situation, the relevant PIMs might include, for example, some PIMs that identify the initiation of a CME or other shock-related solar elements (customized for and/or trained on the particular conditions of solar minimum), those PIMs that are aimed at modeling particle acceleration, and those PIMs that calculate current positions of the assets of interest (e.g. based on mission flight plans, etc.). At a similar time (i.e. during solar minimum) the same (or a different) user might be running the more routine PIMs associated with the prediction of "killer" electron events using PIMs associated with coronal holes, high speed streams in the solar wind, and corotating interaction regions.

An example of how a cascading hybrid system functions is now provided. In this example, the initial starting condition is Solar Max. Because there is only one starting condition, there might be dozens of PIMs actively analyzing their respective data streams. At some point, one (or several) of these PIMs identify the initiation of a CME. This new piece of information then cascades back into the system (as "secondary data" 2811) and the starting conditions now include two pieces of information: Solar Max and the initiation of a CME. Now some of the PIMs might stop analyzing their data (e.g. if their starting conditions preclude their functioning during CMEs) and other PIMs might now start analyzing data (e.g. those that have starting conditions requiring the initiation of a CME).

For example, in one embodiment, there is a PIM that has the starting conditions {during Solar Max and within 5 hours of a CME initiation}. If these starting conditions are met, the PIM then uses a template system to analyze SEP data and look for a particular "key feature" indicative of the initiation of a proton event (e.g. a particular time-course of data values, a particular ratio of data values, etc.). If the PIM finds this key feature, it might then have an action (such as "notify the operator that something big is happening") and also might add the new starting condition "Proton Event in progress." At this point, there will be three starting conditions and again certain PIMs will drop out and others will enter. Meanwhile, a PIM taking solar electron data as input, identifies that electron acceleration is taking place. At the same time, another PIM (analyzing low-energy ion species data, e.g. 3He), identifies intensity enhancements and also predicts that solar electron acceleration is taking place. Because both of these PIMs generate the same conclusion (i.e. that solar electron acceleration is occurring), this prediction will be assigned greater weight.

A hybrid system functioning in such a cascading fashion is more accurate than a non-cascading system due to a number of factors. First, because a cascading hybrid system is a feedback system in which multiple PIMs contribute to generate new identifications/predictions which are then fed back into the starting conditions, all the PIMs in a cascading system have much richer inputs (e.g. they have access to secondary data in addition to primary data) and have outputs that can have wide-reaching impacts on other PIMs (e.g. even though one PIM may be generating an identification with a low-level of confidence, the resulting change in conditions may allow other PIMs to confirm this "hypothesis"). Second, because the PIMs may have access to both raw data and processed ("secondary") data, they often prove effective in analyzing data and predicting/identifying events even during periods when data are noisy (e.g. when another event is in process, when data are missing, when data are slow in arriving, etc.). Additionally, as was the case with the unitary and hybrid systems described above, the results (forecasts, identifications, etc.) of a cascading hybrid system are often better than those given by known space weather prediction techniques, providing for example longer lead-times, better accuracy, "all-clear" signals, measures of confidence, numerical indexes of event size, etc.

Another advantage of a cascading hybrid system is that it can encompass PIMs which are built-around equations, models, or techniques that contain variables that are often difficult (or even impossible) to estimate or evaluate. The problem of variable estimation is even more challenging when one desires predictions or forecasts well in advance of an event (e.g. 42 hours or more in advance). For example, consider the known equations below:

Dst (nT)=$2\times10^{\wedge}-2V2\text{Sqrt}(n2)-20-42(10^{\wedge}3V2Bs-0.5)$ where V2 is the post-shock solar wind speed, n2 the post-shock solar wind density, Bs=0 if Bz>0 and =Bz otherwise, (from Burton, R. K., R. L. McPherron, C. T. Russell, 1975, "An empirical relationship between interplanetary conditions and Dst," Journal of Geophysical Research, 80, 4204–4214).

Kp=2.09(+/−0.20)−0.91 (+/−0.19)V2Bz, (from Hardy, D. A., W. J. Burke, M. S. Gussenhoven, M. Heinemann, and E. Holman, 1981, "DMSP/F2 electron observations of equatorward auroral boundaries and their relationship to the solar wind velocity and the north-south component of the interplanetary magnetic field," Journal of Geophysical Research, 86, 9961–9974).

Kp=9[1−exp(−(sigmaB+0.35)/7.70)] where sigmaB=Sqrt (Bz^2+0.5C^2 Bo^2) (from Ballif, J. R., D. E. Jones, and P. J. Coleman, Jr., 1969, "Further evidence on the correlation between transversefluctuations in the interplanetary magnetic field and Kp," Journal of Geophysical Research, 74, 2239–2301).

A PIM could be built around any of these equations. However, in each case there is a significant parameter (e.g. Bz, V2, n2, etc.) in the equation that is often difficult (or impossible) to estimate. Thus, any simple, stand-alone model or system built around one of these equations, would have marginal value. However, once one (or all) of these equations are put into PIMs and included in a larger cascading hybrid system, their value is greatly increased, because of the synergy created by the system as a whole. In particular, many of the "core" PIMs (built around template, expert, neural network, and hybrid systems, in accordance with the present invention) are able to provide reliable values for the unknown parameters (often with a longer lead-time than is otherwise available).

Moreover, by using PIMs to forecast such significant parameters, improved empirical equations (i.e. new empirical PIMs) may, in some cases, be derived. These new equations may, in turn, be more robust since they may have a sounder theoretical/empirical basis. For example, as described above Dst may be accurately forecast using a neural network that takes SEP values as inputs. Thus, such a neural network may comprise a PIM that obtains Dst independently from, for example, the PIM that might be built around the Burton et al. (1975) equation cited above. These two predictions of Dst can then be compared both with each other and with measured values of Dst to obtain confidence levels, weighting factors, etc.

Furthermore, it is also possible to "rearrange" the Burton et al. equation to solve for a parameter other than Dst (e.g. Bz, V2). Because one (or more) of the PIMs in the system can provide estimates of Dst, it is now possible to use the rearranged equation to solve for Bz or V2. These values can then be compared to measurements (or estimates) obtained from other sources (e.g. measured by a spacecraft, obtained from another equation cited above, etc.). This cascading continues as all the PIMs iteratively and interactively converge on better and better forecasts, predictions, identifications, etc.

The cascading hybrid systems described above are not dependent on any particular hardware embodiment. The systems could run within one computer or other computational system (e.g. specialized hardware) or, alternatively, on a plurality of computers or other computational devices. In one embodiment, different subsets of PIMs are active on different computational devices (preferably interconnected by private or public wired/wireless networks) all of which are connected (again through, for example, public or private wired/wireless networks) to other computational or storage devices which contain all or portions of the "current conditions" and other data.

One skilled in the arts should recognize that these cascading systems are not limited to particular hardware embodiments, to any particular static (or variable) type or number of PIMs, to any particular data type or data rate, to any particular set of data sources, to any particular "decision rules" (2817, 2821), or to any particular means or methods of action/notification. One skilled in the art will also appreciate that numerous "proxies" can be used in place of any/all the variables described in the above PIMs.

The PIMS and cascading hybrid systems described above can interface with forecasts by others and/or with known ways of notification and remedial action so as to improve the accuracy of the forecasts and to insure that correct, timely, and custom-tailored mitigating actions are undertaken when appropriate.

Furthermore, one skilled in the art will recognize that PIMs and cascading hybrid systems can also be used to determine if a space weather event is a natural event or man-made event (such as the result of a nuclear weapon explosion). For example, a man-made event would be indicated if the PIMs detect the formation of a third radiation belt or intense electromagnetic pulses and do not detect natural precursors to these events—i.e., there are no solar/interplanetary precursor events. In one embodiment, a PIM is created that looks for the combination of events: e.g., (third radiation belt or intense electromagnetic pulse) and (no solar/interplanetary precursors). When this combination of events occurs, this PIM identifies a "probable man-made event." In this case, the appropriate PIMs and cascading hybrid predictions and/or actions for man-made events may be automatically implemented.

One skilled in the art will recognize that comparisons or analyses of the predictions yielded by PIMs can be used to gain insight into physical processes and/or models of such processes. For example, a PIM consisting of a neural network or other system (e.g. a hybrid or other multimodal intelligent system) that uses SEP data as inputs might, over the course of time, empirically "derive" a model of a physical process that is far more advanced (e.g. accurate, simple, etc.) than current models. Thus comparisons of these models (or PIM outputs), for example, may indicate that additional or fewer physical mechanisms are important in these physical settings and may thus lead to the inclusion or exclusion of the corresponding terms in these equations and/or to the inclusion or exclusion of corresponding input data sets to the PIMs.

Systems of Customization and Notification

All the embodiments of the present invention thus far described (template, expert, neural network, hybrid, and cascading) are capable of generating predictions. In one sense, a prediction is the end result of a space weather forecasting system. However, in another sense (and/or in other situations), a prediction is only part-way to the end result. For example, a system might predict that a severe proton event will occur at the Earth in 32 hours. However, often what an end-user (such as a satellite operator) wants to know is "how will this event impact my assets?!" Or, perhaps the end-user would prefer only to be notified IF there will be a major impact on his assets. Thus, in addition to the real problem of space weather forecasting, the present invention addresses the need for customized forecasts and notification.

Figure 19:
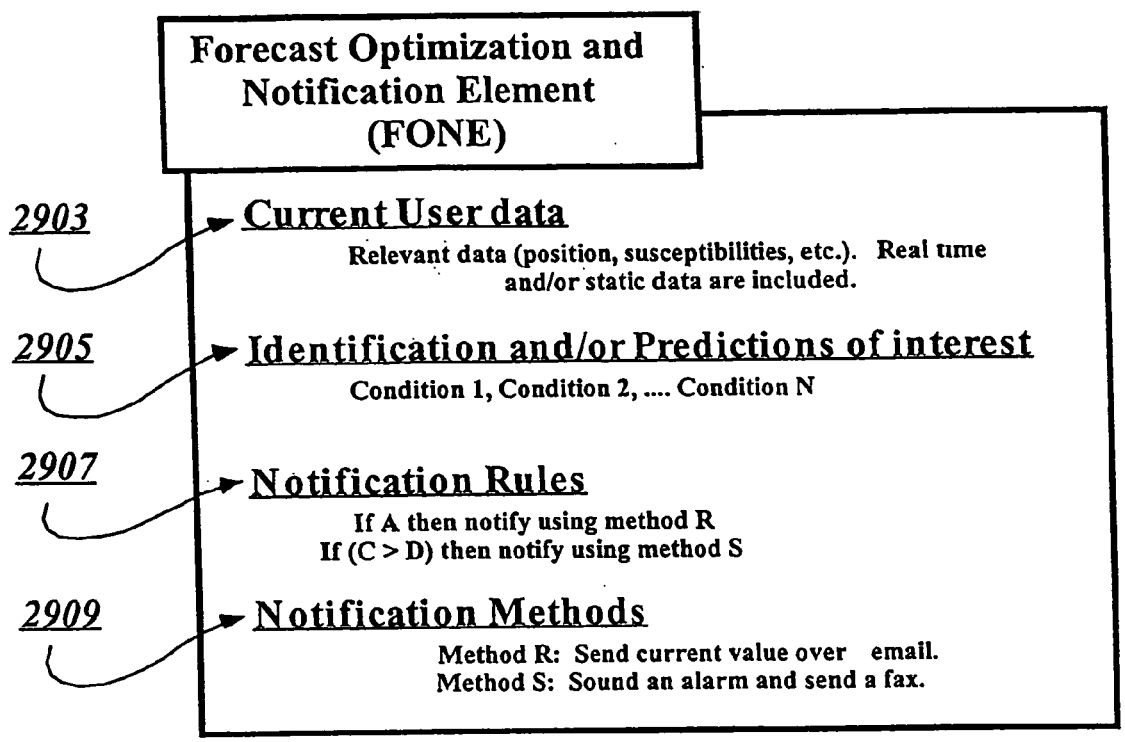
FIG. 19 illustrates a generic forecast optimization and notification element (FONE).

In one embodiment of the present invention, customized forecasts and notification are provided via "Forecast Optimization and Notification Elements" (FONEs). FONEs are, in many respects, similar to the PIMs which were described above. As illustrated in FIG. 19, a FONE contains the following elements:

(a) A set of current user data 29 that are relevant to the FONE. These data may be static or updated in real time. The data preferably may be accessed from/through, for example, any of the sources of data shown in FIG. 1. In one embodiment, these data contain the current and future positions of the users assets (e.g. the position and trajectory of a spacecraft, the flight path of an airplane, etc.) updated in real time. Alternatively or additionally, these data may contain the susceptibilities of particular assets (e.g., a spacecraft, military personnel, etc.) to space weather events. These susceptibility data may be static (e.g. the susceptibility of an airplane's material composition might not change over time) or may be dynamic (e.g. the overall susceptibilities of a satellite will change over time as a function of its position in the earth's magnetosphere, or the susceptibilities of individuals might change as a function of their age or of their recent exposures, etc.).

(b) A list of the identifications or predictions 2905 of interest to the FONE 2905. These identifications or predictions are aspects of the "current conditions" (e.g. as described in the previous cascading hybrid system) that the FONE is monitoring. Identifications or predictions of interest could include such things as particular data values surpassing a set (or variable) level (e.g. radiation levels exceeding X, or the intensity of >2 MeV electrons exceeding Y) or the initiation of certain events (e.g. the formation of a radiation belt). In one embodiment the identifications or predictions of interest are focused on electrical conditions that could harm a user's assets (e.g. GICs, spacecraft charging, etc.). In another embodiment, the identifications or predictions of interest are focused on radiation and other conditions that could harm an astronaut or other personnel (e.g. radiation exceeding levels of human safety, etc.). In yet another embodiment, they are focused on conditions that interfere with communications (e.g. a change in the position or state of the ionosphere). In still another embodiment, they are focused on conditions that interfere with navigational or tactical systems (e.g. GPS unreliability due to ionospheric or other conditions). In another embodiment, they are focused on conditions that could affect the physical state of user's assets (e.g. changes in atmospheric density near a satellite).

(c) A set of notification rules 2907. These rules define, sometimes generally and sometimes specifically, the actions that should be taken if particular conditions 2905 are met. These actions could include, but are not limited to, any of the following:

the transmission of information (e.g. via phone calls, fax, email, internet, private data lines, etc.). Included in the transmitted information could be details regarding the particular event, such as, but not limited to, the predicted time of the event, the predicted size of the event, the predicted impact of the event, confidence levels regarding any predictions, "windows" or ranges (of time, of position, of impact, etc.).

the display of information (e.g. on a computer terminal, on a web site, on a vehicle control panel, etc.). The display might include some or all of the previously discussed transmitted information as well as, optionally, data from other sources. The display of information could be in numeric or graphical form, including such standard forms as graphs (bar, chart, line, etc.), tables, level-meters, etc, or might be in a known format or a format specified by a scientist, inventor, artists, etc. The display could also be in a non-standard form. In one embodiment, the display is a three-dimensional display showing, for example, time on the x-axis, probability of an event on the y-axis, and a hypothetical range of variables on the z-axis. An examination of such three-dimensional graphs (through either visual or numeric means) could allow users to better understand the probabilities associated with a particular event (e.g. a user might see that a particular event is only likely IF, for example, their asset moves to position X, or IF their astronaut partakes in EVA for more than 3 hours, or IF the solar wind increases its density or velocity above Y or Z).

the initiation or variation of an audible sequence. Such a sequence could consist of, for example, sounding an alarm or playing a song/tone that has particular aspects varied as a function of variable(s) of interest. For example, the loudness of the tone could be a function of the severity of an event, the frequency of the tone could indicate the type of event (low-tone=a shock, high-time=radiation hazard, etc.), the variation (over time) of the tone could indicate the time-to-arrival, etc. Alternatively, a song may be played to indicate a desired action (e.g. if a satellite operator hears a lullaby begin, then they know that it is time to initiate a phased shutdown).

the initiation of a set of mitigating actions (e.g. activate phased shut downs of sensitive equipment, begin using redundant transmissions, etc.).

(d) A set of notification methods 2909. These methods define ways in which notifications should be carried out. For example, if a notification rule 2907 specifies that an alarm should sound in a particular situation, then the notification method might specify more details regarding the means of sounding the alarm.

Once a set of one or more FONEs has been created, it will function in a fashion similar to the way that the PIMs of a cascading system operate. In particular, the FONEs, preferably at all times, will have access to a list, or database, of "current conditions," including those relating to space weather, user assets, conditions of interest, etc. This list of current conditions could be the same list used by the PIMs, or it could be a subset of this list, or it could be a different list altogether. Additionally, this list could be maintained in the same computer or network as the FONEs, or it could be in a different computer/network/storage medium (but, one to which the FONEs have access through, for example, any of the means illustrated in FIG. 1). In most instances each FONE is relatively independent of other FONEs and each FONE will only depend on a particular subset of the "current conditions" 2903. Also, the relevant data may be accessed in real-time, or they may be accessed only occasionally.

As new data are obtained (either primary data 2809 or secondary data 2811), each FONE will examine the data and, if the relevant conditions are found 2905, and if the FONE calls for one or more actions, execute the appropriate actions.

Several examples of customized forecasts and notification will serve to further illustrate this aspect of the present invention. In May 1999 hospitals in Los Angeles were in a panic. They kept paging their physicians for telemedicine and for other medical reasons and no physicians were responding. They did not realize that the Galaxy IV satellite had been subjected to a space weather event and as a result pagers throughout North America were no longer operational. In this case PIMs in accordance with the present invention would have forecast the space weather event and FONEs in accordance with the present invention would have sent advanced notification of the potential Galaxy IV problems to Galaxy IV operators and/or users in the agreed upon formats/fashions. In this example, the Galaxy IV spacecraft operators would have previously provided (on a confidential basis, if required) the Galaxy IV priorities, locations, susceptibilities, capabilities and users. Then the operator (and each of the users) would have received warnings or notifications early (e.g., at least several hours in advance) in a preferred format e.g., alarm bells for the operator, and emails, pages, phone calls, or faxes, etc to the users. This early and reliable notification would have allowed the operator to take mitigating actions, such as phased shut downs of sensitive spacecraft systems, implementation of backup modes and work arounds—such as the use of other satellites, etc. Meanwhile the early notification to the users of Galaxy IV would have given them a "heads up"—so that, if necessary, they also could take mitigating actions, (such as notifying all pager customers that in three hours they might experience an interruption of service). The pager customers, including the physicians in Los Angeles, could in turn make their own arrangements, such as calling in on hard-wired telephones (i.e. not cell or mobile phones) for messages every 30 minutes, etc. Of course, the notifications to the end-users (e.g., the physicians) could either come directly through the FONEs as described above or could be delivered by third parties (e.g., satellite operators, call centers, call providers, etc.) after the FONE system notified one of these parties directly or indirectly.

Another example of a customized forecast in accordance with an embodiment of the present invention is the prediction of radiation dosage or potential radiation exposures for high-flying airplanes at high latitudes on polar flight paths. Such a customized forecast may have a number of steps, including, for example:

(a) Obtaining a preliminary filed flight plan indicating the plane's planned position as function of time.

(b) Obtaining predictions from first PIMs of SEP flux profiles as a function of time for various energy ranges (eg, >1 MeV, >10 MeV, >100 MeV, etc.).

(c) Obtaining predictions from second PIMs (that are possibly, though not necessarily different from the first PIMs) of profiles for SEP fluence as a function of time and position (e.g., altitude, latitude, auroral oval, etc.) outside the airplane based on the preliminary flight path in the polar region and the SEP flux profiles obtained from the first PIMs.

(d) Using average thickness of shielding (e.g., in terms of 4 cm of aluminum, or 8 g cm−2, etc.) of the particular airplane to predict the radiation dosage inside the airplane based on preliminary flight plan.

(e) If this dosage equals or exceeds 80% (or whatever threshold the airline or pilots' union or other customer has specified) of the maximum allowable dosage (e.g., 0.5 rem, 1 rem, 2 rem, etc.) specified by the customer, then alert the customer in the specified manner (e.g., computer, email, alarm, pager, etc.).

(f) If requested, provide additional information to assist customer in filing a more suitable flight plan. This additional information could include options such as flying at a lower altitude in the polar region, not flying a polar route, etc.

(g) If a polar flight plan is still filed, following take-off obtain final filed flight plan and compare with preliminary filed flight plan. If they are essentially similar, use radiation dosage predicted above. If they are substantially different, re-calculate dosage predictions. Additionally, in one preferred embodiment, the dosage values can be obtained in real-time by, for example, accessing and then using the current flight position as well as current PIM output data, etc.

One skilled in the art will recognize that the airplane example described above exemplifies the type of steps that may be used to make customized or tailormade forecasts. Similar steps are used, for example, for making health hazard dose predictions for astronauts on the ISS. In this case, for example, the allowable dosage for each astronaut may be known (e.g., 50 rem maximum annual dosage), and, for example, using SEP profiles, the individual dosage (e.g., on EVA, inside ISS, etc.) can be predicted several days and/or hours in advance. Thus, a severe health-hazard situation can be readily determined in advance and an appropriate alarm, warning, work-around, etc. issued. Similarly, such steps are used to predict spacecraft anomalies and/or failures, GPS inaccuracies, communications blackouts, power surges and GICs at electric power grids, etc.

The custom forecasts and notification system in accordance with the present invention provides flexibility and accuracy. This is due in part to the following (which is not an exhaustive list):

Multiple FONEs, can act in parallel (e.g. on all the available "current conditions"—including primary or secondary data) and can act in an automated fashion.

Each FONE can act on any PIM output (unlike currently known custom forecast systems that typically operate on only a single, final prediction). In particular, in a system in accordance with the present invention several "moderately-probable" predictions, identifications, etc. can come together to suggest an event (or an aspect of an event) and thus yield an identification or forecast.

One or more FONEs and/or their relevant PIMs can be "offsite" (e.g. in a separate computer, facility, etc.) and the relevant inputs can be fed to them from another location or locations (e.g. through any of the means shown in FIG. 1) so that they can generate their forecasts and/or actions at this offsite location.

One or more FONEs can initiate and perform mitigating actions, such as reconfiguring a spacecraft, at an offsite location (e.g., the spacecraft).

The FONEs can specify multiple methods of forecast/notification. Additionally, different types of forecasts, identifications, or events can have different methods of notification.

Some data and/or calculations may occur in real time while others can be pre-calculated to shorten the response time.

Contingency Plans

As described above, it is often desirable to develop—well in advance—contingency plans that will go into effect when certain criteria are met, such as when a notification is received from a FONE or when a PIM outputs a certain result. For example, a contingency plan might identify the means of communication or flight paths to be used during periods of elevated radiation levels. Another contingency plan might identify or describe more detailed analyses to be conducted when precursory signs are discovered (e.g. the initiation of a CME). These plans could be developed in advance and could be associated with specific trigger events, threshold values, and/or PIM/FONE outputs.

Because PIMs and FONEs can serve as generic activation or notification agents, they can be used to notify other processes and give rise—either directly or indirectly—to resultant actions. Therefore, PIMs and FONEs can be used to initiate such pre-defined contingency plans. In the course of creating, customizing, and tailoring PIMs and FONES, contingency plans and actions can be developed for specific assets and users as a function of the severity, locations, and other characteristics of the space weather disturbance and the susceptibilities, needs, and constraints of the customers.

One skilled in the art will realize that such triggers and contingency plans can also be developed based on stand-in variables. Such stand-in variables may, for example, be variables that are correlated with the true variables of interest. Alternatively, such stand-in variables may be those that are known to often precede events or levels of interest. For example, actions, processes, ranges, configurations, and other contingencies can be developed around stand-in variables that identify or predict, for example, high radiation levels for astronauts or airline crews, loss of lock of GPS receivers during warfare or other military operations, loss of HF and SATCOM communications during warfare, terrorist activities, jamming incidents, or other times (such as elevated radiation levels, e.g. near assets of interest), lack of natural radiation bursts (e.g., to help rule out possible man-made nuclear events), or ground-based power outages.

In accordance with the present invention, PIMs, FONEs, and their trigger levels and resultant actions (including contingency plans) can be implemented using simulated or real data. They can also be implemented using specific values derived, e.g., through the use of formulae or look-up tables, or ranges of values (e.g. maxima, minima, or variable bands). Additionally, PIMs, FONEs, and their resultant actions (including contingency plans) can include multiple dimensions. For example, a contingency plan may include multiple paths to take, notifications to make, actions to carry out, means of carrying out the actions, and implementations of the actions for specific situations. Additionally, since PIMs and FONEs can monitor variables created by other PIMs and FONEs, one PIM/FONE could (either directly or indirectly) trigger a cascade of notifications, actions, contingency plans, etc.

For example, the same changes in the space weather environment resulting in severe disturbances often demand the use of different contingency plans by the military depending on whether they are in the midst of warfare or they are not at war. Space weather disturbances can result in GPS errors in the calculated positions of troops, targets, aircraft, naval assets, and mines. Space weather disturbances can cause effects in transmissions and disruptions of HF radio and SATCOM, spacecraft anomalies, false targets, false sensor readings, and degradation of assets. Also, assets at a given geolocation can suddenly find themselves exposed to severe space weather as a result of space weather effects on the size and shape of the magnetosphere. For example, due to an extreme solar wind pressure pulse, a spacecraft that was within the earth's magnetosphere can suddenly be outside the magnetopause or even outside the bow shock, and thus exposed to the space weather environment without any protection from the earth's magnetic field and magnetospheric environment. Meanwhile space-based assets remaining within the magnetosphere and ground-based assets also may experience extremely adverse space weather conditions including increased radiation exposures from solar energetic particles, from the formation of a new radiation belt, from particle precipitation, and from electromagnetic phenomena. Magnetic merging, field aligned currents, perpendicular currents, ionospheric and magnetospheric electric fields, the auroral oval, polar cap potentials, polar cap absorption, density gradients, global TEC variations, ionospheric scintillations, sudden ionospheric disturbances, storm-induced Joule heating, UV heating, FUV phenomena, waves, and pitch angles all can be caused by or effected by an adverse space weather event and in turn lead to adverse effects. These space weather disturbances and others, as well as their adverse effects, can be forecasted by a system and method in accordance with the present invention. Indices such as Kp, Dst, AU, AE, AL, SI, and others (each of which can also be forecasted by a system and method in accordance with the present invention) typically reflect various aspects of such adverse space weather events.

Contingency plans and actions may include reconfiguring spacecraft and other resources, and repositioning and utilizing other space-based and ground-based assets at numerous locations. These contingency plans and actions can include everything from the protection of space-based and ground-based assets to the protection of human life and safety during peace and during warfare. The contingency plans also can include the seamless transition to the reconfiguration and repositioning of space-based assets and their use, and the use of different space-based or ground-based assets for GPS, search and rescue, communications and broadcasts (including TV, radio, cell phone), telemedicine, credit card transactions, movie-editing, and other activities and transactions. The contingency plans also can include rescheduling replacement of damaged equipment and resources including ground-based power grid equipment, rescheduling military operations, rescheduling manufacturing operations, rescheduling launches and landings, rescheduling EVAs, rescheduling oil drillings, and rescheduling commercial airline bookings for individual passengers with high susceptibility to radiation exposure, such as pregnant women, infants, and others with medical conditions and histories where radiation exposure should be limited.

The contingency plans may be in different forms and in place at several locations, facilities, and assets in order to minimize the adverse effects of space weather disturbances and other disturbances. Space weather disturbances have caused other adverse events, including Northeast ground-based power grid failures, transatlantic cable failures, and broadband and other communication failures. The various forms and locations of contingency plans can also take into account other disturbances, including other natural disturbances such as meteorological, forest fires, seismic, and volcanic disturbances, and accordingly provide protection and minimize the adverse effects during times of such other disturbances. The various forms and locations of the contingency plans can still further take into account man-made disturbances such as acts of warfare, terrorist acts, sabotage acts, human and accidental errors and incidents, machine and systems error, multinational, unilateral, and other political and civilian acts, other military acts, nuclear explosions, jamming, biological and chemical acts, and other acts and again minimize the adverse effects of such acts. The various forms of the contingency plans can include, for example, encryption and independent verification of results and data, decision algorithms, recommended resultant actions, the implementation of resultant actions, business process changes, etc.

Many aspects of the contingency plans for PIMs and FONEs for space weather disturbances can also be used to address processes and resultant actions associated with non-space weather disturbances. Triggers and contingency plans can be developed for example for other stand-in variables, such as thresholds associated with biological, chemical, and radiation contaminants in water supplies, air supplies (e.g., the air in Los Angeles, the air at a warfare site, the air in the ISS, the air around an aircraft carrier), and food supplies. Thresholds also can be developed around other variables including the number of people taken ill with food poisoning on a ship or in an amusement park, or who come into a hospital; and the number of people entering hospitals with specific symptoms such as of anthrax, the flu, SARS, radiation contamination, etc.

Data Collection, Data Assimilation, and DATA Integration

As described above, various forms of input data can be obtained from various data sources. These data are used for example while developing PIMs and FONEs and as input into them while a system in accordance with the present invention is running. Data may be obtained directly from the data sources as described above (e.g. via direct links with a customer, partner or ally database or website or a public-domain data source) or through the use of intelligent agents, data agents, or data "sniffers" (e.g an intelligent agent configured to go out and get data from a website or partner database every N milliseconds). In one preferred embodiment, an intelligent agent looks for new data from the NOAA website every minute. If new data are found, the agent downloads the data and integrates them into the appropriate PIMs, FONEs, subsystems, tables, etc. Standard or custom ETL (Extract, Transform, and Load) routines may be used in these processes. The obtained data can be integrated on a scheduled basis, using for example batch loads, such as flat files, or integrated in real time, using for example the intelligent agents and sniffers.

Also, in addition to data sources identified previously, data can be obtained from sources such as, but not limited to:

a) real-time scientific data sets from solar probes and spacecraft orbiting the sun at distances much closer than that of the earth and those capable of providing data from the side of the sun not seen from earth;

b) data from LEO, GEO, MEO, nanosats, etc.;

c) data from ionosondes, global scale ionospheric and atmospheric measurements, ground-based radar and magnetometer facilities;

d) transmissions from distant planetary or interplanetary spacecraft and probes;

e) data from meteorological and other environmental sensors and monitors;

f) data derived from noise or from variations within known signal streams (e.g., variations in strengths of TV transmissions, GPS transmissions, spacecraft transmissions, etc.;

g) launch countdown and instrument and engineering performance data;

h) other systems performance data, including missile strikes, targeting, accuracy of ionospheric scintillation nowcasts;

i) prelaunch and on-orbit data, including data on instrument performance, detector and sensor degradation, solar panel degradation, orientation problems, uplink and downlink problems, orbital decay, noise in imaging systems, performance of microelectronic and other components, decision algorithm errors, critical system malfunctions, memory system alterations, single event upsets, deep dielectric charging, surface charging, induced errors in critical circuitry, control system malfunctions and failures, evidence of physical damage from impacts, etc.;

j) diurnal, two week, 27-day, seasonal, yearly, solar cycle and other types of phenomena and systems data reports;

k) other scientific or environmental monitoring data reports;

l) results from physics-based equations, simulations, and modeling; and m) reports or information regarding business, insurance, manufacturing, agriculture, prices, consumer consumption, airline flight paths, take-offs and landings, search and rescue, medical, municipal, national, space-based imaging including of specific ground-based locations and of atmospheric conditions, confidential company data, and public relations data.

While the invention has been particularly shown and described with reference to particular illustrative embodiments thereof, it will be understood by those skilled in the art that various changes in form and details are within the scope of the invention, which is defined by the claims. For example, the template-based embodiment is not limited to any particular CRITERIA and the expert system embodiment is not limited to any particular set of rules. Expert system rules need not look at only mean, raw or average activity levels; they also could specify distributions, e.g., variances or standard deviations of particles or of other data (solar, interplanetary, or geophysical). Such expert systems could also include rules based on the time between recent events or the distribution of the times between such events. Additionally, the rules embodied by an expert system need not be "binary" in nature (i.e. all-or-none): expert systems can also be built around "fuzzy" rules that specify, for example, a probability, amount, or other non-binary criteria/function. Similarly neural networks systems can also include other artificial intelligence systems and intelligent hybrid systems. Additionally, the techniques described herein may be combined in various ways; for example, a hybrid system may generate predictions by applying some or all of the template-based, expert system-based and neural network-based techniques simultaneously. In one hybrid embodiment, for example, the templates may indicate fast/slow events originating from West, Central or East solar locations and peak flux and the neural network may confirm the solar origin of the events and predict whether or not a geomagnetic storm will occur. A hybrid system could generate a final prediction in many ways, such as, but not limited to, a "worst case" prediction (i.e., based on the shortest arrival time predicted by the output of the subsystems) or a weighted prediction based on some measure of confidence, certainty, or reliability (e.g., agreement over time, or number of standard deviations, or distance from ideal output, or agreement with previous prediction, etc.).

The accuracy of any of the above embodiments can be increased by using versions of the embodiments that are specialized for the particular circumstances. For example, if optical or other data sources indicate an event is in the Western longitudes of the sun, then specialized Western only templates can be used to increase accuracy. Similarly, for the neural network embodiment, if data are obtained indicating that it is currently a period of increased solar activity (e.g., solar maximum), then the neural networks specialized for these conditions can be used. Again similarly, specialized rules can be dynamically employed in an expert system. For example, in periods of low solar activity, if a peak is detected over some low threshold, a storm would be predicted, whereas in periods of high solar activity (e.g., solar maximum) a peak at a higher flux level might be required before a warning is issued.

Finally, although the algorithms and techniques described above focused primarily on SEP data, the same or similar algorithms and techniques can and have been applied by the inventors to generate space weather forecasts based on other types of solar, interplanetary and geophysical data.

What is claimed is:

1. A method for notifying a user of possible space weather events comprising:
    providing predictions or identifications of possible space weather conditions to a notification module, the notification module comprising
    user data specifying one or more of a position of a user's asset or a susceptibility of the user's asset to space weather events,
    means for receiving the predictions or identifications of the space weather conditions, and
    data specifying rules for actions to be performed in response to the received predictions or identifications of space weather conditions; and
    performing the actions specified in the rules based on the provided predictions or identifications.

2. The method of claim 1 further comprising the step of providing information regarding one or more of terrorist activities, warfare, or jamming incidents.

3. The method of claim 1 wherein the identifications of possible space weather conditions comprise one or more of information regarding a loss of HF or SATCOM communications, noise in imaging systems, variations within one or more known signal streams, a loss of lock of GPS receivers during warfare or other military operations, agriculture, or damage from impacts.

4. The method of claim 3 wherein the known signal streams comprises one or more of a TV transmission, a GPS transmission, or a spacecraft transmission.

5. The method of claim 1 further comprising the step of:
    providing information regarding one or more natural non-space weather events; and
    wherein the step of performing comprises performing the actions specified in the rules based on the provided predictions or identifications and information regarding the one or more natural non-space weather events.

6. The method of claim 5 wherein the one or more natural non-space weather events are one or more of a meteorological event, a forest fire, a seismic disturbance, or a volcanic disturbance.

7. The method of claim 1 further comprising the step of:
    providing information regarding one or more man-made events; and wherein the step of performing comprises performing the actions specified in the rules based on the provided predictions or identifications and information regarding the one or more man-made events.

8. The method of claim 7 wherein the information regarding the one or more man-made events comprises information regarding one or more of a terrorist act, terrorist activities, a sabotage act, a human or accidental error or incident, a political or civilian act, jamming, warfare, a military act, or a nuclear explosion.

9. The method of claim 1 wherein the actions specified in the rules comprise one or more of encryption of data, independent verification of results and data, or business process changes.

10. The method of claim 1 further comprising the step of:
providing other information regarding one or more of a machine or system error, a biological act, a chemical act, or a radiation act; and
wherein the step of performing comprises performing the actions specified in the rules based on the provided predictions or identifications and the provided other information.

11. The method of claim 1 wherein the predictions or identifications are provided in part by an intelligent agent.

12. A system for notifying a user of possible space weather events comprising:
a notification module comprising
user data specifying one or more of a position of a user's asset or a susceptibility of the user's asset to space weather events,
means for receiving predictions or identifications of possible space weather conditions,
data specifying rules for actions to be performed in response to the received predictions or identifications of space weather conditions, and
means for initiating the actions specified in the rules based on received predictions or identifications.

13. The system of claim 12 wherein the notification module further comprises means for receiving information regarding one or more terrorist activities, warfare, or jamming incidents.

14. The system of claim 12 wherein the identifications of possible space weather conditions are based on information regarding one or more of a loss of HF or SATCOM communications, noise in imaging systems, variations within one or more known signal streams, a loss of lock of GPS receivers during warfare or other military operations, agriculture, or damage from impacts.

15. The system of claim 14 wherein the known signal streams comprises one or more of a TV transmission, a GPS transmission, or a spacecraft transmission.

16. The system of claim 12 further comprising:
means for receiving information regarding one or more natural non-space weather events; and
wherein the means for initiating initiates the actions specified in the rules based on received predictions or identifications and information regarding the one or more natural non-space weather events.

17. The system of claim 16 wherein the one or more natural non-space weather events are one or more of a meteorological event, a forest fire, a seismic disturbance, or a volcanic disturbance.

18. The system of claim 12 further comprising:
means for receiving information regarding one or more man-made events; and
wherein the means for initiating initiates the actions specified in the rules based on received predictions or identifications and information regarding the one or more man-made events.

19. The system of claim 18 wherein the information regarding the one or more man-made events comprises information regarding one or more of a terrorist act, terrorist activities, a sabotage act, a human or accidental error or incident, a political or civilian act, jamming, warfare, a military act, or a nuclear explosion.

20. The system of claim 12 wherein the actions specified in the rules comprise one or more of encryption of data, independent verification of results and data, or business process changes.

21. The system of claim 12 further comprising:
means for receiving other information regarding one or more of a machine or system error, a biological act, a chemical act, or a radiation act; and
wherein the means for initiating initiates the actions specified in the rules based on received predictions or identifications and the provided other information.

22. The system of claim 12 wherein the predictions or identifications are provided in part by an intelligent agent.

23. The method of claim 1 wherein the actions specified in the rules comprise the identification of one or more of a means of communication or a flight path to be used during periods of elevated radiation.

24. The method of claim 1 wherein the actions specified in the rules comprise the identification of analyses to be conducted when precursory signs are discovered.

25. The method of claim 1 wherein the predictions or identifications of possible space weather conditions comprise one or more of a severity or location of one or more space weather conditions.

26. The method of claim 1 wherein the predictions or identifications of possible space weather conditions comprise stand-in variables correlated with or known to often precede space weather conditions.

27. The method of claim 26 wherein the stand-in variables identify or predict one or more of high radiation levels for astronauts or airline crews, loss of lock of GPS receivers during warfare or other military operations, loss of HF or SATCOM communications during warfare, terrorist activities, jamming incidents, elevated radiation levels near assets of interest, lack of natural radiation bursts, or ground-based power outages.

28. The method of claim 1 wherein the predictions or identifications provided in the step of providing predictions or identifications are based on one or more of simulated or real data.

29. The method of claim 1 wherein one or more of the predictions or identifications or rules are based on specific values derived using one or more of a formula, look-up table, or range of values.

30. The method of claim 1 wherein the notification module further comprises data regarding a presence or absence of warfare and wherein at least one of the rules for action depend on the data regarding the presence or absence of warfare.

31. The method of claim 1 wherein the actions specified in the rules comprise one or more of reconfiguring spacecraft or other resources, or repositioning or utilizing alternative space-based or ground-based assets.

32. The method of claim 1 wherein the actions specified in the rules comprise utilizing alternative assets for one or more of GPS, search and rescue, communications, broadcasts, telemedicine, credit card transactions, or movie-editing.

33. The method of claim 1 wherein the actions specified in the rules comprise one or more of rescheduling replacement of damaged equipment, rescheduling military operations, rescheduling manufacturing operations, rescheduling launches or landings, rescheduling EVAs, rescheduling oil drillings, or rescheduling commercial airline bookings for individual passengers with high susceptibility to radiation exposure.

34. The method of claim 1 wherein the actions specified in the rules depend upon the location of the user's asset.

35. The method of claim 1 further comprising the step of:
providing other information regarding one or more thresholds associated with one or more of biological, chemical, or radiation contaminants in water supplies, air supplies, or food supplies, or the number of people taken ill with food poisoning, or the number of people entering hospitals with specific symptoms; and
wherein the step of performing comprises performing the actions specified in the rules based on the provided predictions or identifications and the provided other information.

36. The method of claim 1 wherein the predictions or identifications are provided by one or more prediction/identification modules.

37. The method of claim 1 wherein the predictions or identifications comprise one or more of an extreme solar wind pressure pulse, a formation of a new radiation belt, particle precipitation, electromagnetic phenomena, magnetic merging, field aligned currents, perpendicular currents, ionospheric and magnetospheric electric fields, the auroral oval, polar cap potentials, polar cap absorption, density gradients, global TEC variations, ionospheric scintillations, sudden ionospheric disturbances, storm-induced Joule heating, UV heating, FUV phenomena, waves, or pitch angles.

38. The method of claim 1 wherein the predictions or identifications predict or identify one or more of Kp, Dst, AU, AE, AL, or SI.

39. The system of claim 12 wherein the actions specified in the rules comprise the identification of one or more of a means of communication or a flight path to be used during periods of elevated radiation.

40. The system of claim 12 wherein the actions specified in the rules comprise the identification of analyses to be conducted when precursory signs are discovered.

41. The system of claim 12 wherein the predictions or identifications of possible space weather conditions comprise one or more of a severity or location of one or more space weather conditions.

42. The system of claim 12 wherein the predictions or identifications of possible space weather conditions comprise stand-in variables correlated with or known to often precede space weather conditions.

43. The system of claim 42 wherein the stand-in variables identify or predict one or more of high radiation levels for astronauts or airline crews, loss of lock of GPS receivers during warfare or other military operations, loss of HF or SATCOM communications during warfare, terrorist activities, jamming incidents, elevated radiation levels near assets of interest, lack of natural radiation bursts, or ground-based power outages.

44. The system of claim 12 wherein the predictions or identifications received by the means for receiving are based on one or more of simulated or real data.

45. The system of claim 12 wherein one or more of the predictions or identifications or rules are based on specific values derived using one or more of a formula, look-up table, or range of values.

46. The system of claim 12 wherein the notification module further comprises data regarding a presence or absence of warfare and wherein at least one of the rules for action depend on the data regarding the presence or absence of warfare.

47. The system of claim 12 wherein the actions specified in the rules comprise one or more of reconfiguring spacecraft or other resources, or repositioning or utilizing alternative space-based or ground-based assets.

48. The system of claim 12 wherein the actions specified in the rules comprise utilizing alternative assets for one or more of GPS, search and rescue, communications, broadcasts, telemedicine, credit card transactions, or movie-editing.

49. The system of claim 12 wherein the actions specified in the rules comprise one or more of rescheduling replacement of damaged equipment, rescheduling military operations, rescheduling manufacturing operations, rescheduling launches or landings, rescheduling EVAs, rescheduling oil drillings, or rescheduling commercial airline bookings for individual passengers with high susceptibility to radiation exposure.

50. The system of claim 12 wherein the actions specified in the rules depend upon the location of the user's asset.

51. The system of claim 12 further comprising:
means for providing other information regarding one or more thresholds associated with one or more of biological, chemical, or radiation contaminants in water supplies, air supplies, or food supplies, or the number of people taken ill with food poisoning, or the number of people entering hospitals with specific symptoms; and
wherein the means for initiating initiates the actions specified in the rules based on the provided predictions or identifications and the provided other information.

52. The system of claim 12 wherein the predictions or identifications are provided by one or more prediction/identification modules.

53. The system of claim 12 wherein the predictions or identifications comprise one or more of an extreme solar wind pressure pulse, a formation of a new radiation belt, particle precipitation, electromagnetic phenomena, magnetic merging, field aligned currents, perpendicular currents, ionospheric and magnetospheric electric fields, the auroral oval, polar cap potentials, polar cap absorption, density gradients, global TEC variations, ionospheric scintillations, sudden ionospheric disturbances, storm-induced Joule heating, UV heating, FUV phenomena, waves, or pitch angles.

54. The system of claim 12 wherein the predictions or identifications predict or identify one or more of Kp, Dst, AU, AE, AL, or SI.

* * * * *